United States Patent [19]
Burke

[11] Patent Number: 6,064,521
[45] Date of Patent: May 16, 2000

[54] POLARIZING RESONANT SCATTERING THREE DIMENSIONAL IMAGE SCREEN AND DISPLAY SYSTEMS

[76] Inventor: Douglas Burke, 2507 Port Whitby, Newport Beach, Calif. 92660

[21] Appl. No.: 08/856,451

[22] Filed: May 14, 1997

[51] Int. Cl.[7] ............................. G03B 21/55; G03B 21/60
[52] U.S. Cl. ...................... 359/443; 359/452; 359/458; 353/8
[58] Field of Search ............................ 353/7, 8; 359/443, 359/452, 453, 458; 348/51

[56] References Cited

U.S. PATENT DOCUMENTS

| | | | |
|---|---|---|---|
| 2,341,982 | 2/1944 | Dillehay | 88/28.93 |
| 2,997,390 | 9/1961 | Land | 96/29 |
| 3,248,165 | 4/1966 | Marks et al. | 352/61 |
| 3,709,580 | 1/1973 | Fugitt et al. | 350/157 |
| 4,268,127 | 5/1981 | Oshima et al. | 350/337 |
| 4,936,658 | 6/1990 | Tanaka et al. | 350/337 |
| 5,193,015 | 3/1993 | Shanks | 359/53 |
| 5,299,289 | 3/1994 | Omae et al. | 359/95 |
| 5,347,644 | 9/1994 | Sedlmayr | 359/465 |
| 5,650,872 | 7/1997 | Saxe et al. | 359/296 |
| 5,669,690 | 9/1997 | Hodson et al. | 353/122 |
| 5,686,979 | 11/1997 | Weber et al. | 349/96 |
| 5,694,245 | 12/1997 | Goto et al. | 359/460 |
| 5,716,122 | 2/1998 | Esaki et al. | 353/33 |
| 5,760,954 | 6/1998 | Tatsuki et al. | 359/452 |

*Primary Examiner*—Safet Metjahic
*Assistant Examiner*—Christopher E. Mahoney

[57] ABSTRACT

Systems and method of displaying images of entire scenes in apparent three dimensions. A projector projects images with light onto a multi-layered composite transparent sheet polarizing screen. The dimensions of the screen whose optically active layers are determined by the intensity and the mixture of polarization states of the projected light. The images appear to be three dimensional. A bead layer of the screen contains beads on the order of a wavelength of visible light.

24 Claims, 15 Drawing Sheets

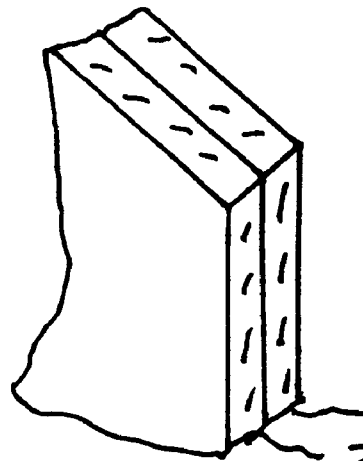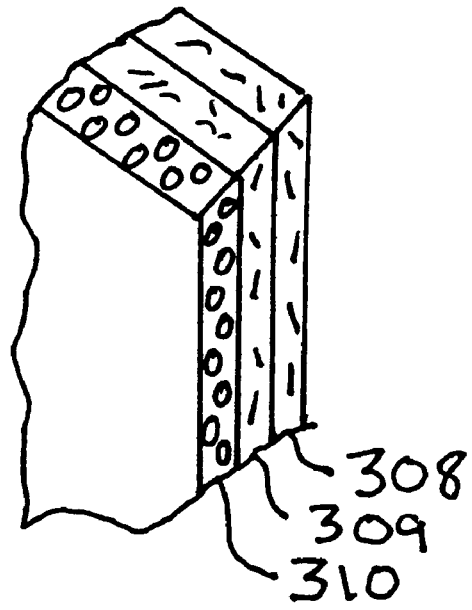
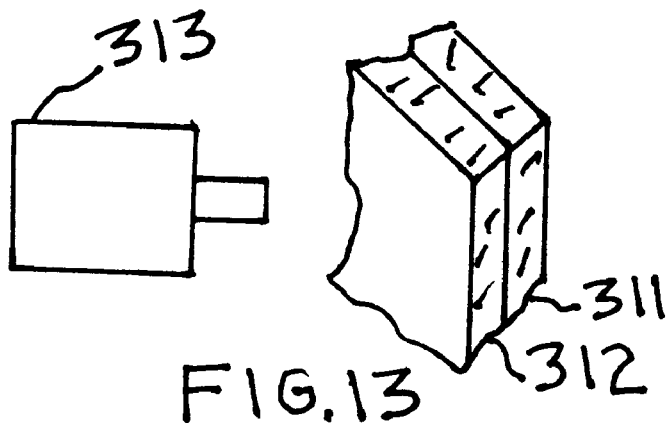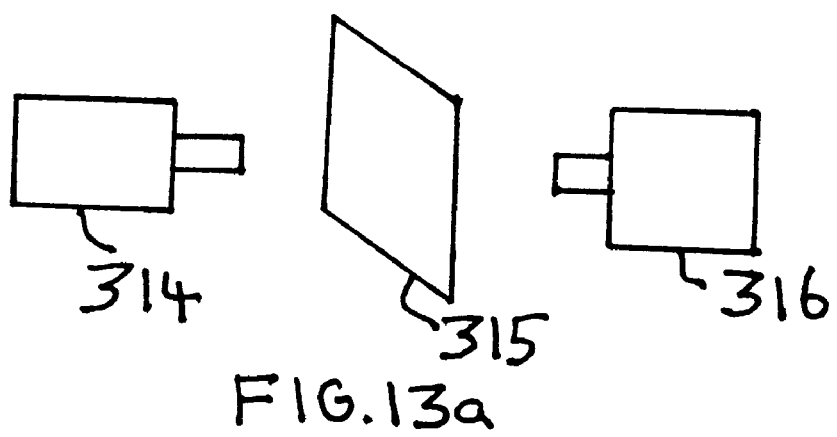

POLARIZING RESONANT SCATTERING THREE DIMENSIONAL IMAGE SCREEN AND DISPLAY SYSTEMS

FIELD OF THE INVENTION

This invention relates to a method and system of producing and displaying images n apparent three dimensions. It is an improved evolution of my earlier work, U.S. Pat. No. 5,469,295.

BACKGROUND OF THE INVENTION AND DISCUSSION OF PRIOR ART

Light can be represented as electromagnetic fields which vary sinusoidally and orthogonal to the direction of propagation as shown in FIG. 1. [where the direction of propagation is along the Z-axis.] In FIG. 1 the electric field component of the wave is denoted by E, and the magnetic field component is denoted by B.

For the purposes of this invention it is only the electric field component of the wave which will interact with matter and produce relevant phenomena. An electric field is simply the force per unit electric charge in a region of space. Equivalently, if an electric charge were in a region of space occupied by an electric field it would experience a force equal to the electric field times the magnitude of the charge.

Electric fields can be represented mathematically as vector quantities indicating their magnitude and direction at a specific point or in a given region of space. FIG. 1A is the electromagnetic wave in FIG. 1, but with the view looking down the axis of propagation, the Z-axis. FIG. 1-A shows some possible orientations of the electric field. These are only some possibilities. Any orientation in the plane normal to the direction of propagation is possible. That plane is represented as the plane that the circle in FIG. 1A occupies.

As light, an electromagnetic wave, propagates, the behavior of the electric field in space and time is determined by Maxwell's equations, which are a set of equations defined by James Clerk Maxwell which constitute the physical laws of electromagnetism. Maxwell's equations have solutions for travelling waves where the electric field varies along an axis as in FIG. 1, varies in a circular of elliptical manner, or varies randomly.

The orientation of the electric field vector and how it changes with time is known as the state of polarization of the electromagnetic wave or just simply the polarization of the light. If the electric field is confined to a single axis as in FIG. 1 it is said to be linearly polarized. In FIG. 1 it is linearly polarized in the X or vertical direction. Since the electric field at any given moment is confined to a plane parallel to the direction of propagation and a plane is two dimensional, there are only two possible independent polarization states for light. We can think of them as horizontal and vertical. Although in physics and mathematics the two unique polarization states used are sometimes right and left circular polarization, these states are simply combinations of vertical and horizontal states that vary in time in the right way to represent an electric field that rotates in a circular clockwise manner or counterclockwise as the wave propagates. The specific time relationship between the vertical and horizontal states is called a phase relationship.

If the electric field in FIG. 1 is not confined to a single axis in the plane but has an equal probability of being in the horizontal or vertical direction and there is no specific phase relationship between the vertical and horizontal electric fields the light is said to be unpolarized or randomly polarized.

The electric field can be polarized and confined to an axis that makes and angle, $\theta$, with the horizontal or x-axis as shown in FIG. 1B. Since the electric field is a vector quantity when it is polarized in this manner, it can be broken up into horizontal and vertical components. In FIG. 1B the horizontal axis is the x-axis and the vertical axis is the y-axis. The electric field E in FIG. 1B has a horizontal component equal to $E \cos \theta$ and a vertical component equal to $E \sin \theta$, this being a trigonometric fact. It can be said that the electric field in FIG. 1B has a part of itself, $E \cos \theta$, polarized along the x-axis and the rest of itself $E \sin \theta$, polarized along the y-axis. The sides of the triangle in FIG. 1B formed by E, $E \cos \theta$, and $E \sin \theta$ obey the pythagorean theorem, which means they obey the relations $E^2 \cos^2 + E^2 \sin^2 \theta = E^2$. For the purposes of our discussion it must be understood that the electric field E has a component $E \cos \theta$ polarized in the x-direction and a component $E \sin \theta$ polarized in the y-direction.

Some materials act as polarizers. If randomly polarized light enters into a slab of finite thickness of polarizing material with the material's polarization oriented say in the vertical direction, the horizontally polarized portion of the incident light is absorbed and the vertically polarized portion is allowed to pass through the material. The result is that the light emanating out of the polarizing material is polarized in the vertical direction thus polarizing materials polarize light.

One can think of polarizers as having a transmission axis or sense and an absorption axis or sense. It is more general to use the word sense than axis since axis implies the idea of linearity to the imagination of the reader and that does not apply to circular polarizers and so can become confusing when one is trying to provide broad and general clarity.

If linearly polarized light oriented in the vertical direction enters a linear polarizer whose absorption sense is oriented in the vertical direction the light will be absorbed. Equivalently, if linearly polarized light is projected onto a polarizer whose absorption sense is equal to the polarization sense of the light, the light is absorbed. If linearly polarized light is projected onto a polarizer whose absorption sense is orthogonal to the polarization sense of the light, the light is transmitted.

The same statements of what happens physically can be made using reference to the transmission sense of the polarizer. For instance, if linearly polarized light is projected onto a polarizer whose transmission sense is equal to the polarization sense of the light the light is transmitted. If linearly polarized light is projected onto a polarizer whose transmission sense is orthogonal to the polarization sense of the light, the light is absorbed.

Circular polarizers have an absorption sense and a transmission sense as well. The above reasoning carries through for circular polarizers and circularly polarized light. For instance if circularly polarized light is projected onto a circular polarizer with an absorption sense equal to the polarization sense of the light, the light is absorbed. If the absorption sense of a circular polarizer is left, left circularly polarized light is absorbed when projected onto the polarizer etc.

To expand our vocabulary to encompass an understanding of the relationship between linear polarization (of light or materials), circular polarization (of light or materials), and light that is unpolarized the following facts must be rigorously observed.

(1) Unpolarized light can be represented as an equal mixture of horizontal linearly polarized light and vertical linearly polarized light, where the phase relationship between the vertical and horizontal linearly polarized states is random.

(2) Unpolarized light can also be represented as an equal mixture of right circularly polarized light and left circularly polarized light, where the phase relationship between the right and left circularly polarized states is random.

(3) Linearly (horizontal or vertical) polarized light can be represented as a linear combination of right and left circularly polarized light, where the phase relationships between the right and left circularly polarized states is specific.

(4) Circularly (right or left) polarized light can be represented as a linear combination of horizontal and vertical linearly polarized light, where the phase relationship between the horizontal and vertical linearly polarized states is specific.

The above facts can be derived from Maxwell's equations or from the quantum mechanical theory of light. Both methods produce the same results. Further the above facts have been verified by experiment with great rigor.

For the purposes of this invention the phase relationship in facts (3) and (4) does not have any physical optical consequences. So we can think of linearly polarized light as an equal amount of right and left circularly polarized light; and we can think of circularly polarized light as an equal amount of horizontal and vertical linearly polarized light.

If circularly polarized light is projected onto a linear polarizer the part of the light that has a polarization sense equal to the transmission sense of the polarizer is transmitted and the other part has a polarization sense equal to the absorption sense of the polarizer and is absorbed. The same holds for linearly polarized light projected on to a circular polarizer.

The interrelationships between linearly and circularly polarized light and linear and circular polarizers relate to this invention.

Some linear polarizers are composed of metal crystals aligned along a specific direction. These are also called metal polarizers. Metal polarizers do not have an absorption sense but have instead a reflection sense. The orthogonal sense to their reflection sense is their transmission sense. Metal polarizers relate to some aspects of this invention.

The making of sheet polarizers, polarizing material on large sheets of substrates, was pioneered by Edwin H. Land and more by John F. Dreyer. The polarizing layer on these substrates is called a dichroic layer. The phenomena of polarizers and polarizing sheets relate to this invention.

There are also techniques of depositing thin layers of metal, metal oxides, or conducting polymer materials onto substrates. These layers do not polarize light but they act as partial reflectors. They reflect only part of the light that is shined upon them. When you look at one of these layers on a clear substrate you can see objects on the other side and you can also see your reflection. As the thickness of these layers is increased the reflective property increases and the transparent property decreases. The phenomena of partial reflection relates to this invention.

Polarizing layers and partially reflective layers can be combined as parallel elements onto substrates to produce laminates that can be used for various purposes. Various prior art techniques have been developed to produce such combinations of parallel elements for various purposes. See U.S. Pat. No. 2,776,598 to Dreyer, U.S. Pat. Nos. 2,788,707 and 2,997,390 to Land, U.S. Pat. No. 4,025,688 to Nagy et al., U.S. Pat. No. 5,347,644 to Sedlmayr et al., and U.S. Pat. No. 3,248,165 to Marks, et al.

Other materials are largely transmissive, meaning their reflecting qualities are minimal. That is to say when one shines light on them the majority of it goes through then without being reflected or absorbed. Transparent and transmissive materials relate to this invention.

Other materials are partially transparent and diffusive. Diffusive means that they scatter light in many directions. Intrinsically, this diffusive quality is due to natural perturbations in the index of refraction. Extrinsically the diffusive quality is due to pores, grain boundary defects, strain fields, small quantities of particulate matter, and crystallographic defects. Optical materials are generally made to minimize the diffusive quality but in some designs of the proposed invention it is actually desirable to have a partial diffusiveness. Candidate materials that have a partial diffusiveness include; alkali and alkaline earth halides such as chlorides, bromides, iodies, $B_aF_2$, $P_bF_2$; oxides such as $Al_2O_3$; oxynitrides such as ALON; chalcogenides such as ZnSe and ZnS; and semiconductors such as Si, Ge, and Go,As. The extrinsic diffusiveness can be adjusted depending on how the materials are made. For more details see, Optical Materials, Ed Solomon Musikant; Marcel Dekker, Inc. 270 Madison N.Y., N.Y. 10016. The partial transparency is a achieved by using only a thin layer of such materials.

This invention employs combinations of polarizing, reflective, diffusive and transmissive parallel elements combined on an optical substrate of specific design parameters, governed by the operation of the invention. Also this invention claims a new application for sheet polarizers in general and the novelty of that application dictates specific structural and dimensional parameters for such sheet polarizers.

Various prior art techniques and apparatus have been heretofore proposed to present three dimensional images on a viewing screen using a stereographic technique such as on a polarization conserving motion picture screen.

See U.S. Pat. No. 4,955,718 to Jachimowicz, et al., U.S. Pat. No. 4,963,959 to Drew, U.S. Pat. No. 4,962,422 to Ohtomo, et al., U.S. Pat. No. 4,959,641 to Bess, et al., U.S. Pat. No. 4,957,351 to Shioji, U.S. Pat. No. 4,954,890 to Park, U.S. Pat. No. 4,945,408 to Medina, U.S. Pat. No. 4,936,658 to Tanaka, et al., U.S. Pat. No. 4,933,755 to Dahl, U.S. Pat. No. 4,922,336 to Morton, U.S. Pat. No. 4,907,860 to Noble, U.S. Pat. No. 4,877,307 to Kalmanash, U.S. Pat. No. 4,872,750 to Morishita, U.S. Pat. No. a4,853,764 to Sutter, U.S. Pat. No. 4,851,901 to Iwasaki, U.S. Pat. No. 4,834,473 to Keyes, et al., U.S. Pat. No. 4,807,024 to McLaurin, et al., U.S. Pat. No. 4,799,763 to Davis, U.S. Pat. No. 4,772,943 to Nakagawa, U.S. Pat. No. 4,736,246 to Nishikawa, U.S. Pat. No. 4,649,425 to Pund, U.S. Pat. No. 4,641,178 to Street, U.S. Pat. No. 4,541,007 to Nagata, U.S. Pat. No. 4,523,226 to Lipton, et al., U.S. Pat. No. 4,376,950 to Brown, et al., U.S. Pat. No. 4,323,920 to Collendar, U.S. Pat. No. 4,295,153 to Gibson, U.S. Pat No. 4,151,549 to Pautzc, U.S. Pat. No. 3,697,675 to Beard, et al.

These techniques and apparatus involve the display of polarized or color sequential two-dimensional images which contain corresponding right eye and left eye perspective views of three dimensional objects. These separate images can also be displayed simultaneously in different polarizations or colors. Suitable eyewear, such as glasses having different polarizing or color separations coatings permit the separate images to be seen by one or the other eye. This type of system is expensive and cumbersome because it requires collecting the image from two different views which demands a special camera or two cameras.

U.S. Pat. No. 4,954,890 to Park discloses a representative projector system employing the technique of alternating polarization.

Another technique involves a timed sequence in which images corresponding to right-eye and left-eye perspectives are presented in timed sequence with the use of electronic light valves. U.S. Pat. No. 4,970,486 to Nakagawa, et al., and U.S. Pat. No. 4,877,307 to Kalmanash disclose representative prior art of this type. This time sequence technique also requires the use of eyewear.

There is another example of the timed sequence technique in which the left and right eye views have different polarizations and are viewed not with glasses but with a single polarized screen over both eyes. The screen is formed of a transparent material that has two or more different specialty coatings. U.S. Pat. No. 5,347,644 to Sedlmayr discloses representative prior art of this type.

The timed sequence also requires collecting the image from different views, right eye and left eye.

Alternating polarization and timed sequence stereoscopic techniques both possess the following disadvantages; the image cannot be collected or displayed with convention single view equipment, and eyewear is required for viewing.

U.S. Pat. No. 5,543,964 to Taylor et al. is another example of superimposing images to create an illusion of depth based on the stereo nature of human vision. The proposed invention creates depth using a single image and is not based on binocular vision. Another superimposition technique is shown in U.S. Pat. No. 5,556,184 to Nader-Esfahani. Again the proposed invention is not based on superimposition of images. U.S. Pat. No. 5,589,980 to Bass displays images in apparent three dimensions using two display devices, one being in front of the other creating apparent depth. The proposed invention displays images in apparent three dimensions using a single screen instead of two.

U.S. Pat. No. 5,559,632 to Lawrence et al. introduces special glasses for viewing regular images in apparent three dimensions employing stereoscopic theory. The proposed invention is not based on stereoscopic theory, and does not require eyewear.

It is known that holographic techniques have been used for three dimensional information recording and display. These techniques involve illuminating a three dimensional object with a coherent (laser) beam of light and interfering that light with a reference beam from the same source. The interference pattern is collected on a recording film medium and illumined with the same coherent light from which it was made. The result is a projected image of the object in three dimensions able to be viewed without eyewear. Holographic techniques are not in general use because inherent in them are many limitations: an object has its dimension limited to an extent that it can be illuminated by a laser beam; the object should be stationary; a photograph thereof must be taken in a dark room; and the image cannot be collected and displayed in real time.

Some of the limitations of holography have been addressed by a technique known as composite holography.

Composite holography consists of photographing a three dimensional object in a plurality of different directions under usual illumination such as natural light to prepare a plurality of photographic film sections on which two-dimensional pictorial information is recorded. These two dimensional photographs are information images and are separately illumined with coherent (laser) light and are recorded as holograms. These holograms are then simultaneously illumined with coherent (laser) light producing a projection of the perspective information of the three-dimensional object to be recognized by unaided human eyes at different angles depending upon their position with as much effect as one substantially views the image of the three dimensional object.

Composite holography was limited since the size of the recording medium of the holograms had to be large leading to a large sized overall device making it economically impractical. That limitation was resolved by Takeda et al. as disclosed in U.S. Pat. No. 4,037,919. Also in that disclosure is a detailed description of composite holography.

The disadvantage of composite holography is that it involves photographing the object from many different angles and making a hologram of each of those photographic images. This makes it impossible to collect and display the three dimensional image in real time. A further disadvantage is that it is time consuming, laborious and expensive.

Another example of prior art includes a dual screen system composed of foreground and background screens. The images are collected and projected with incoherent white light. This dual screen system is disclosed in U.S. Pat. No. 3,248,165 to Marks et al.

Referring to FIG. 2 Marks' invention includes two projectors 30 and 31 for projecting two beams of light towards a multiple screen 32. A polarizing filter 33 polarizes the light from projector 30, so that the beam is polarized in the vertical direction as shown by arrow 34. Projector 31 directs its beam of light through a polarizing filter 35 so that the beam which is directed toward the screen arrangement is polarized in a horizontal direction as indicated by arrow 36.

FIGS. 2A, 2B, and 2C illustrate the manner in which the two screens are formed. The foreground screen 37 is formed with a plurality of holes 38 cut in the screen in a symmetrical array.

In the embodiment of FIG. 2D the solid part of the foreground screen is made up of three layers and includes a supporting sheet 39 which is made of some transparent plastic material. On the side facing the projectors, a thin polarizing film 40 is secured for passing rays of light polarized in the direction passed by the polarizing filter having a parallel plane of polarization and for absorbing the rays polarized at right angles thereto. On the back of the sheet 39 a diffuser-reflector film 41 is secured for reflecting the light rays in a diffused manner without changing their plane of polarization. This diffused reflector film is comprised of small aluminum flakes dispersed in a binder. Behind the diffuser-reflector film is a black coating.

The background screen 42 is composed of the same films and layers as the foreground screen 37 except no holes are cut in this screen and the plane of polarization of the polarizing film 40A is at right angles to the polarizing plane of film 40. In the example shown this plane is horizontal.

FIG. 2D illustrates the method in which the two screens cooperate with the two projectors. The two arrows 43 designate rays of two beams of vertically polarized light, one of which strikes a portion of the foreground screen 37 and also rays of two beams 44 polarized in a horizontal direction, one of said rays being directed through a hole 38 in the foreground screen and incident upon the background screen 42. One of the rays 43A from the projector 30 strikes a portion of the foreground screen and penetrates the polarizing film 40, the plastic film 39, and is diffusely reflected by the reflecting sheet 41. The polarizing film 40 is arranged for passing light which is vertically polarized.

A second ray of light 43B from projector 30 passes through one of the holes 38 and is incident upon a polarizing film 40A on the rear screen 42 which is arranged to pass light which is polarized only in the horizontal direction. For this reason light ray 43B is absorbed in film 40A and cannot be seen by the audience. In a like manner, a ray of light 44A, polarized horizontally, strikes polarizing film 40 and is absorbed while another ray 44B from this same projector passes through hole 38, strikes polarizing film 40A, and is transmitted to the diffusing reflecting sheet 41. The reflected light rays 45 are directed toward the audience but only a portion of them pass through holes 38.

It will be obvious from the above description that one portion of the picture will be projected to the background screen 42, where it will be viewed by the audience while another portion of the picture is projected onto the foreground screen 37 where it also will be seen by the audience. In general, the background picture will contain objects that are generally parts of a background such as a distant set of objects or a portion of a room or other enclosure which forms the background of a scene. The foreground screen generally will show the actors or other moving objects which are generally desired to be shown in a position which is closer to the audience.

The background screen is on a mechanical motor driven track which enables its distance from the foreground screen to be adjusted.

Marks' dual screen system requires two projectors, one for the foreground image and one for the background image. This is a disadvantage because it is desirable to project the image with conventional single projection equipment so that the extra cost involved in equipping a theatre or home entertainment unit is minimal. It will become obvious that the proposed invention produces a three-dimensional image with a single conventional projection unit.

Marks' system requires two screens to produce apparent depth, a foreground and a background screen. The proposed invention produces apparent depth with a single screen.

Marks' system produces an image with an apparent three dimensional quality of an entire landscape that includes actors and foreground objects on the foreground screen and scenery and background objects on the background screen. The foreground screen is partially transparent because it has holes in it This partial transparency of the foreground screen gives rise to the apparent depth between the foreground and background. The solid part of the foreground screen and the entire background screen are both opaque to the naked eye. The partial transparency of the foreground screen is, again, due to actual physical holes. If the system were displaying a static scene on the background screen and a moving person or object on the foreground screen and a viewer were looking at the image of person or object on the foreground screen from say, ten feet away, the viewer would see holes in the image of the person or object on the foreground screen and the image would not look real. A disadvantage of this system is that it cannot display a performer on a stage in a small theatre or barroom because the audience is too close and the holes in the screen will be seen. This disadvantage also disqualifies this system to be a small home display where a life size three dimensional display of a person could be used for a video phone display or a computer or television display since the viewer would only be several feet from the screen, and again the holes would be visible.

Dual polarizing reflection filter is another technique of producing on three dimension image and was introduced by myself as disclosed in U.S. Pat. No. 5,469,295. This technique involves projecting an image with polarized light onto a sheet polarizing, partially reflective screen whose polarization sense if orthogonal to that of the projected light. Thus the isolated projected image is stopped completely on the partially transparent screen. I shall refer to U.S. Pat. No. 5,469,295, as the Burke I system.

FIG. 3 shows a perspective view of the basic embodiments of the Burke I system which a projector which projects an image with polarized light 102, a real physical three dimensional object 103A a projected image 105, a partially reflective and transparent sheet polarizing screen 104 of the opposite polarization sense to that of the polarizer 102 and a real physical three dimensional object 103B.

The screen 104 consists of several layers and a perspective view of the cross section of a first design for the screen is shown in FIG. 5.

The screen consists of a transparent substrate 108, a polarizing layer 109, a binding layer 110, another transparent substrate 111A, and a partially reflective and transparent layer 111B.

A perspective view of the cross section of a second design for the screen of the Burke I system is shown in FIG. 6. The screen consists of a transparent substrate 112A, a polarizing layer 113, a transparent binding layer 114A, a transparent substrate 115A, a partially reflective and transparent layer 115B, a transparent binding layer 114B, and a transparent substrate 112B. In both screens proposed the partially reflective and transparent layer is closest to the projector and the polarizing layer is behind the partially reflective and transparent layer and is thus farther from the projector.

In both screens the transparent substrates must be made of materials that do not change the state of polarization of light when it passes through them.

The transparent substrates 108, 111A, 112A, 112B, and 115A, are clear glass or plastic. 108, 112A, and 112B are thick enough so that the screen has mechanical stability for a given size of viewing area. 111A and 115A are only thick enough so the partially reflective and transparent layer can be bound to the polarizing layer.

The polarizing layers 109 and 113 are of an orthogonal polarization sense to that of the projected light.

The reference objects 103A, 103B are real physical three dimensional objects placed in front of and behind the screen.

Referring to FIGS. 3 and 4; the projector 102, projects the isolated image with polarized light in the frame 106 and does not project the surrounding background in the frame 107 because it is opaque.

The polarized projected image moves through the air until it hits the partially reflective and transparent sheet polarizing screen 104 where it is stopped, reflected and seen on the screen as a solid image.

Referring now to FIG. 7, the polarized light carrying the image is represented diagrammatically as a wave 115. The partially reflective and transparent sheet polarizing screen, though it is many layers, is represented schematically in FIG. 7 as two layers, a partially reflective and transparent layer 119, and a polarizing layer 120.

When the polarized projected wave 115 hits the partially reflective and transparent layer 119; part of it is a reflected wave 116 and is seen by the audience as the image of the subject on the screen; part of it is a transmitted wave 117 and moves through the partially reflective and transparent layer 119. The transmitted wave 117 moves into the polarizer 120 and becomes an absorbed wave 118 as the polarizer absorbs and diminishes its amplitude to zero. The polarizing material must be thick enough so that the wave 118 decays to zero while it is in the polarizer 120. This insures that none of the projected light passes through the screen since that which is not reflected is absorbed.

The wave that is transmitted 117 through the partially reflective and transparent layer 119 must not have its polarization changed as it passes through the material 119 since the reason it is absorbed by the polarizer 120 is because it has a polarization sense orthogonal to the polarizing material. Equivalently if the projected wave has a vertical polarization the sheet polarizer has a horizontal polarization sense and vice versa.

The viewer sees by way of unpolarized light since there is no eyewear required and his or her perception is accomplished with the naked eye. Since unpolarized light is an equal amount of vertically and horizontally polarized light we can examine the path of sight of the view by examining the interaction of each polarized state of light with the screen.

The light by which the viewer sees that is polarized orthogonal to the polarization sense of the polarizer 120 in the screen can be represented diagrammatically by the wave 126 in FIG. 7. The wave 126 hits the screen's partially reflective and transparent layer 119 and part of it is a reflected wave 127 which is small in amplitude compared to the reflected wave 116 and is relatively unseen. Part of the wave 126 becomes a transmitted wave 128 and passes through the partially reflective and transparent layer 119 and moves into the polarizing layer 120 and becomes an absorbed wave 129 and decays to zero in the polarizer.

The light by which the viewer sees that is polarized parallel to the polarization sense of the polarizer 120 in the screen can be represented diagrammatically by the wave 121 in FIG. 7. The wave 121 hits the screen's partially reflective and transparent layer 119 and part of it is a reflected wave 122 which is small in amplitude compared to the reflected wave 116 and is relatively unseen. Part of the wave 121 becomes a transmitted wave 123 and passes through partially reflective and transparent layer 119 and into the polarizing layer 120 where the transmitted wave is referred to as 124. The wave 124 is polarized parallel to the polarization sense of the polarizer 120 in the screen and therefore the wave 124 passes through the polarizer and emerges as wave 125 on the other side of the screen. The wave 121 which becomes waves 123, 124, and 125 and thus passes through the screen is the means by which the viewer sees through the screen and represents the transparent quality of the screen.

Since the reflected wave 116 is much higher in amplitude than the transmitted wave 125 the image of the object or person on the screen which is represented by the wave 116, does not appear to be transparent to the viewer but looks solid.

The light emanating from the reference object that is polarized orthogonal to the polarization sense of the screen is represented by the wave 131 in FIG. 7. Wave 131 propagates toward the screen until it hits it and moves into the polarizing layer 120 and becomes an absorbed wave 132 and decays to zero.

The light emanating from the reference object that is polarized parallel to the polarization sense of the screen is represented by the wave 133. Wave 133 hits the screen and moves into the polarizer and becomes a transmitted wave 134. The transmitted wave 134 moves through the polarizer and hits the partially reflective and transparent layer where part of it becomes a reflective wave 135 and part of it becomes a transmitted wave 136.

The reflected wave 135 moves back into the area behind the screen where it can be absorbed either by an optical absorber or it can travel into abeyance if there is enough space behind the screen.

The transmitted wave 136 moves through the partially reflective layer 119 and on out into the area in front of the screen and is referred to as wave 137 in FIG. 7.

Wave 137 carries with it the image of the reference object and is seen by the viewer. Thus again we see that objects behind the screen are visible to the viewer.

Referring now to FIG. 3 the projected image is stopped by and reflected off of the screen and is seen as a solid isolated figure 105 on a partially reflective and transparent screen 104 with no holes in it.

The isolated image of the subject 105 on the partially reflective and transparent screen 104, in the presence of reference objects 103A and 103B, appears to be three dimensional when viewed by a viewer positioned at any point in front of the screen.

One disadvantage of the Burke I system is that the partially reflective layer is on a substrate which is glued to the polarizing layer when, for simplifying manufacturing, the reflective layer can be bonded directly to the polarizing layer eliminating the need for a substrate and a binding layer. The reflective layer could be a clear polyurethane paint for instance, which has reflective properties and sticks directly to the polarizing layer.

Another disadvantage of the Burke I system is the reflective layer is a separate layer than it could be eliminated by using a polarizer which has reflective properties, thus again simplifying the manufacturing of the system.

Another disadvantage of the Burke I system is that it cannot be structured as a rear projection system, which for some commercial products is more desirable or is required.

Another disadvantage of the Burke I system is that the image can only be viewed from the area in front of the screen which means the area behind the screen is wasted real estate. For entertainment units in restaurants and bars it would be ideal to be able to see the image from either side of the screen.

Another disadvantage of the Burke I system is that it requires the projected image to be projected with fully polarized light. If one wants to use a projector with unpolarized light the light has to be polarized as it comes out the front of the projector and the projected image loses half of its brightness, if the light is polarized using a filter.

The proposed invention includes a bead layer or a diffusive layer. This layer has specific microstructure. The beads are of specific sizes. The diffusive layer has particles in it of specific dimension if it is an extrinsic diffusive material. If it is an intrinsically diffusive material its index of refraction varies periodically in space with specific dimension. This specific dimension is on the order of the size of the wavelengths of projected light. This feature adds depth to the image and is absent in the Burke I System.

The proposed invention also makes use of optical surface area. This is discussed later in this section and again in the section on theory. This feature further increases the depth of the image and is absent in the Burke I System.

The proposed invention is different than the burke I system in the structure and dimension of the screen and the polarization content of the projected light Further the proposed invention produces three dimensional images of entire scenes.

OBJECTS AND ADVANTAGES

The proposed invention is different than Marks' in that in every version of the proposed invention the solid continuous screen is partially transparent because it has a polarizing layer which allows light with a polarization sense parallel to the polarization sense of the screen to pass through the screen whereas the foreground screen in Marks' system is transparent because if has holes in it.

The proposed invention has many versions all of which are different than the Burke I system.

These differences include the exact structural components of the multi-layered screen, the direction from which the image is projected and the polarization content of the light. These differences will become more obvious in the detailed description of the invention.

The other differences of the proposed invention is that it can produce an image of an entire scene that appears to be three dimensional.

The Burke I system can do this as well since an entire scene is simply a summation of isolated objects. Thus the principle of the Burke I system repeated for each object in the scene will produce an entire scene since objects are isolated from each other by their boundaries.

However it is not obvious that the Burke I system can produce a three dimensional image of an entire scene since when you fill the screen with enough images to create an entire scene you cannot see through the screen and see reference objects behind the screen which the theory of the Burke I system says is necessary for the image to look three dimensional. Thus there is no reason to suspect that a summation of images will look three dimensional. The novelty of the proposed invention is that it recognizes that summing images to create a scene yields a three dimensional image and the theory of why that is, is discussed in the section on the theory of the invention.

Accordingly several objects and advantages of the present invention are:

(a) To produce a three dimensional image of a single person or object whereby the person or object is collected on film or video from a single view with a conventional camera eliminating the need for dual cameras as employed in stereoscopic or time sequential techniques;

(b) To produce a three dimensional image of a single person or object whereby the image is collected on film or video with a conventional camera and is illuminated with incoherent white light as it is collected unlike holography where the person or object must be illuminated with laser (coherent) light thus making it possible to produce images without the limitations in size that inhibit holography.

(c) To produce a three dimensional image of a single person or object whereby the person or object is collected on video from a single view with a standard video camera and displayed immediately in real time enabling the present invention to be used in a communication or real time broadcast device unlike holography or composite holographic techniques.

(d) To produce a three dimensional image of a single person or object that can be viewed by the naked eye without the use of eyewear as is required by alternating polarization or time-sequential stereographic techniques.

(e) To produce a three dimensional image of a single person or object that can be projected with a single conventional video or film projection unit eliminating the need for two projectors as is required by the alternating polarization stereoscopic techniques or the need for expensive time sequential light value projection systems as required by time sequential stereoscopic techniques.

(f) To produce a three dimensional image of a person or object that is displayed on a single screen eliminating the need for a background screen as required by dual screen systems (g) To produce a three dimensional image of a single person or object on a solid screen with no holes so that the image can be viewed from short distances and still look real.

(h) To produce a three dimensional image of a single person or object of life size or larger or smaller proportions for a cost that does not exceed the cost for recording and displaying a standard video.

(i) To produce a three dimensional image of a person or object where the image is displayed on a single screen that can also display standard video or film projection.

(j) To produce a three dimensional image on a screen that has only three parallel layers instead of five.

(k) To produce a three dimensional image on a screen that has only two parallel layers.

(l) To produce a three dimensional image on a screen system that has rear projection.

(m) To produce a three dimensional image on a screen that can be viewed from either side of the screen.

(n) To produce a three dimensional image on a screen where the image is projected with unpolarized light.

(o) To produce a three dimensional image of an entire scene with a quality improved from the Burke I system.

(p) To produce a three dimensional image of raw video or film on a two dimensional screen without changing the way the image is collected on video or film by the industry that collects such images.

(q) To produce three dimensional images on a screen that can be viewed from a diversity of viewing angles.

BRIEF DESCRIPTION OF DRAWINGS

FIGS. 9–12 Perspective view of the cross sections of different screens for the proposed invention.

FIG. 13 Perspective view of the cross section of a specific screen design and the position of its layers with respect to the source of projection.

DESCRIPTION OF THE INVENTION

Figure 8:
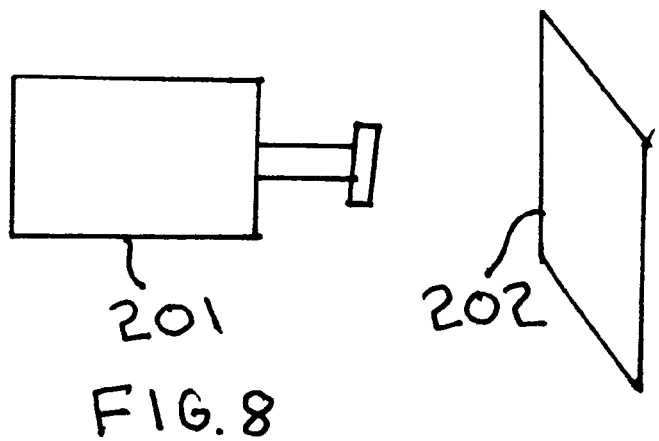
FIG. 8 Perspective view of the basic components of the proposed invention.

FIG. 8 shows the basic embodiments of the proposed invention which include a means of projecting an image 201 and a partially transparent sheet polarizing screen 202 with specific optical layers, properties, and dimensions.

In describing the different screens I shall only talk about a single substrate on which there are optically active layers. Technically each optically active layer can have, its own substrate and a binding layer, however some materials do not require such a substrate and binding layer so I eliminate the additional binding layers and substrates since they do not affect the optics of the invention.

Figure 9:
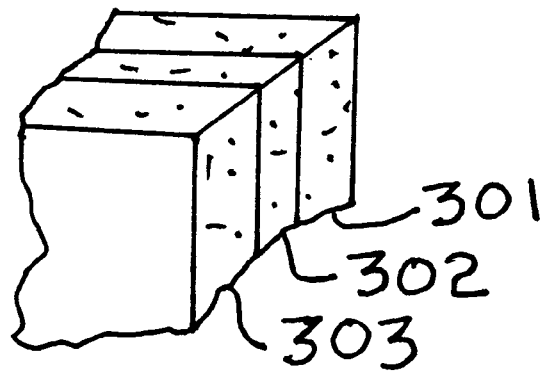

I shall first describe the screens used in the different designs of the proposed invention. The first screen of the proposed invention consists of parallel layers and a perspective view of its cross section is shown in FIG. 9. It consists of a transparent substrate, 301, a polarizing layer, 302, and a partially reflective and transparent layer, 303.

Figure 10:
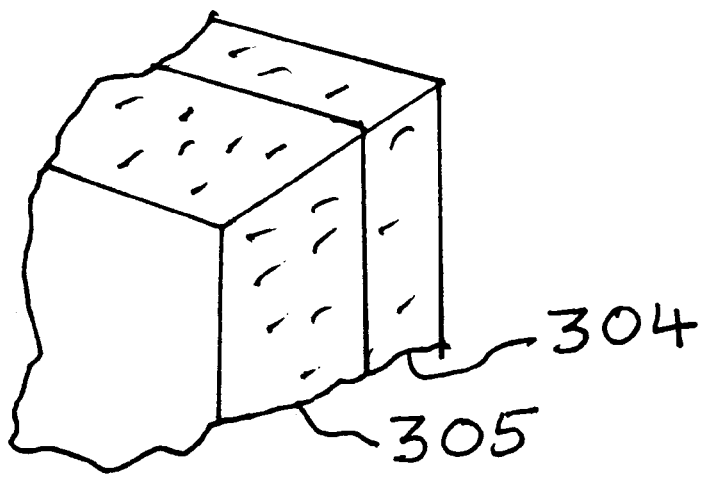

The second screen of the proposed invention consists of parallel layers and a perspective view of its cross section is shown in FIG. 10. It consists of a transparent substrate 304, and a polarizing layer, 305.

The third screen of the proposed invention consists of parallel layers and a perspective view of its cross section is shown in FIG. 11. It consists of a transparent substrate, 306, and a metal polarizing layer, 307.

The fourth screen of the proposed invention consists of parallel layers and a perspective view of its cross section is shown in FIG. 12. It consists of a transparent substrate, 308, a polarizing layer, 304, and a bead layer, 310. The bead layer is composed of small transparent beads embedded in a transparent base whose index of refraction is different than that of the beads. The materials of the bead layer are partially reflective and transparent, unless otherwise specified.

The fifth screen of the proposed invention is the same as the fourth screen only the bead layer is composed of materials with a low reflectivity.

The sixth screen of the proposed invention is the same as the fifth screen only the bead layer is composed of materials with low reflectivity and the polarizing layer is a metal polarizing layer.

The seventh screen of the proposed invention is the same as the fourth screen with the bead layer replaced with a partially transparent, reflective, and diffusive layer.

The eighth screen of the proposed invention is the same as the fourth screen with the bead layer replaced with a partially transparent and diffusive layer with low reflectivity.

The ninth screen of the proposed invention is the same as the fourth screen only the bead layer is replaced with a partially transparent and diffusive layer with low reflectivity and the polarizing layer is a metal polarizing layer.

The tenth screen of the proposed invention consists of parallel layers and a perspective view of its cross section is shown in FIG. 13. It consists of a combination of layers, 311, as defined in any of the screens one through nine and an additional layer, 312. The additional layer, 312, is a thin transparent layer of a material which randomizes the polarization of light which passes through it. Such materials are composed of molecules which are birefringent with each molecule having its optic axis randomly oriented. Many thin layers of plastics fall into this class of materials. One such example is mylar.

All of the screens are composed of at least a sheet polarizer. Screens one, two, and three are sheet polarizing laminate elements that were made by Dreyer and land in the forties and fifties. The proposed invention claims these sheet polarizing elements can catch images that are projected on them with light and display these images in apparent three dimensions. This is not obvious because the screens are two dimensional and when you project a two dimensional image on a two dimensional screen the image on the screen looks two dimensional since that is what the laws of basic optics say. The section on theory will show that physics and psychology are at play, together.

Screens four, five and six have an additional bead layer which further enhances the three dimensional quality of the image and scatters the image in many directions increasing the viewing angle. This additional effect is discussed in the section on theory.

Screens seven, eight, and nine have the bead layer replaced with a partially diffusive and transparent layer which scatters the image in many directions increasing the viewing angle.

The total reason for the three dimensional quality of the images is unobvious and is discussed in the section on theory. The novelty of the three dimensional effect is that the projected image can be a standard two dimensional image. It is not steroscopic, holographic, or composite holographic, but when it is projected on these screens it looks three dimensional.

Screen ten is screens one through nine with an additional layer which randomizes polarization. The significance of this layer will be discussed in the section on operation.

These composite sheet polarizing screens have specific dimensions which are required for the intensity and mixture of polarizational states of the light used to project images onto them. The nature of the light will determine the dimensions of the layers, thus making these screens unique because of their application. Without the correct dimension of layers the screens won't display images.

Another exhibition of the statement that this application of sheet polarizers is unobvious is the fact that the tooling for the manufacturing of sheet polarizers is small not large enough to make large projection televisions or motion picture screens, since this application is unknown. The largest sheet polarizers that are made are used for LCD displays. The size of polarizer required by that industry has scaled the size that are manufactured.

The introduction of the bead layer in combination with the polarizing layer is unique and its functions are discussed in the section on operation and theory.

In the designs of the invention that follow the images that are projected can be isolated images as described in the Burke I system or they can be images of an entire scene that fills the screen. An entire scene is a summation of isolated images each image being defined and isolated from the rest by its boundary which constitutes its identity. Each isolated image in the scene appears to be three dimensional and the summation of the images which is the entire scene appears three dimensional. The reason for this is not obvious and is discussed in the section on theory. Further we eliminate the presence of reference objects since there is always a floor or ground or molecules in the air in front of the screen and behind the screen which present themselves as reference objects. This will be discussed further in the section on the theory of the invention.

The screens have been described as separate embodiments. The designs below are of systems where the light which is projected onto the screens is of a specific polarization or mixture of polarization states.

In the first design of the proposed invention an image is projected with light onto a partially reflective and transparent sheet polarizing screen. The screen consists of several layers and a perspective view of its cross section is shown in FIG. 9. It consists of a transparent substrate, 301, a polarizing layer, 302, and a partially reflective and transparent layer, 303. A portion of the light that is projected has a polarization sense equal to the absorption sense of the polarizing layer, and a portion of the projected light has a polarization sense equal to the transmission sense of the polarizing layer. The image on the screen can be seen from either side of the screen as will be shown in the section on the operation of the invention.

In the second design of the proposed invention an image is projected onto a sheet polarizing screen whose cross section is shown in FIG. 10. It consists of a transparent substrate 304, with a negligible reflectivity and a polarizing layer, 305. The image is projected from one side and viewed from the opposite, thus making this design a rear projection system. Part of the light that is projected has a polarization sense equal to the absorption sense of the polarizer and part of it has a polarization sense equal to the transmission sense of the polarizer.

In the third design of the proposed an image is projected onto a sheet polarizing screen whose cross section is shown in FIG. 11. It consists of a transparent substrate, 306, and a metal polarizer, 307. Part of the projected light has a polarization sense equal to the reflection sense of the polarizer and part of it has a polarization sense equal to the transmission sense of the polarizer, it being important to remember that metal polarizers have a reflection sense instead of an absorption sense.

In the fourth design of the proposed invention the screen is identical to the screen, described in FIG. 9 and the projected light is fully polarized with a polarization sense equal to the absorption sense of the polarizer. This is a more general representation of the Burke I system in that it claims a more three dimensional appearance of an entire scene, and a substrate and binding layer have been eliminated.

In the fifth design of the proposed invention the screen is identical to the screen described in FIG. 10 and the projected light is fully polarized with a polarization sense equal to the absorption sense of the polarizer. The polarizing layer, 305, in FIG. 10 is thin enough so that it only stops a portion of the light while allowing the rest of the light to transmits through the screen.

In the sixth design of the proposed invention the screen is identical to screen described in FIG. 9. The projected light is fully polarized with a polarization sense equal to the absorption sense of the polarizer. The thickness of the polarizer, 302, is thin enough to stop only a portion of the projected light while the rest of the light transmits through the screen.

In the seventh design of the proposed invention everything is the same as in the third design except that the light used to project the image is fully polarized with a polarization sense equal to the reflection sense of the polarizer.

In the eighth design of the proposed invention the screen is identical to the screen described in FIG. 11. The projected light is fully polarized with a polarization sense equal to the reflection sense of the polarizer. The thickness of the metal polarizer, 307, is thin enough to reflection only a portion of the projected light while allowing the rest of the light to transmit through the screen.

In the ninth design of the proposed invention an image is projected with polarized light onto a partially transparent and reflective sheet polarizing screen. The screen consists of several layers and a perspective view of its cross section is shown in FIG. 12. It consists of a transparent substrate, 308, a polarizing layer, 309, and a partially transparent and reflective bead layer, 310. The partially reflective and transparent layer is composed of transparent beads less than 1000 microns in size, embedded in a transparent base whose index of refraction is different than that of the beads. The light that is projected is fully polarized with a polarization sense equal to the absorption sense of the polarizer.

In the tenth design of the proposed invention the screen is identical to the one described in FIG. 12 and part of the light used to project the image has a polarization sense equal to the absorption sense of the polarizer and part of the projected light has a polarization sense equal to the transmission sense of the polarizer.

In the eleventh design of the proposed invention everything is the same as in the ninth design except that the polarizer is thin enough so that it allows some of the projected light to pass through it.

In the twelfth design of the proposed invention the screen is the same as described in FIG. 12 except that the beads are specified to be made out of a material with low reflectivity. The projected light has some of its polarization sense equal to the absorption sense of the polarizer and some of its polarization sense equal to the transmission sense of the polarizer.

In the thirteenth design of the proposed invention everything is the same as in the twelfth design except that the projected light is fully polarized with a polarization sense equal to the absorption sense of the polarizer and the thickness of the polarizer is thin enough to allow some of the projected light to pass through it.

In the fourteenth design of the proposed invention an image is projected onto a screen like the one in FIG. 12, but the polarizing layer, 309, is a metal polarizer and the beads in layer, 310, are composed of a material with negligible reflectivity. The projected light is fully polarized and has a polarization sense equal to the reflection sense of the polarizer.

In the fifteenth design of the proposed invention everything is identical to the fourteenth except the thickness of the metal polarizer is thin enough so that some of the projected light transmits through the screen.

In the sixteenth design of the proposed invention everything is the same as in the fourteenth design except that the light used to project the image has part of its polarization sense equal to the reflection sense of the polarizer, and the other part of its polarization sense equal to the transmission sense of the polarizer.

The ninth through sixteenth designs can have the bead layer replaced with a partially diffusive layer. The transparency and reflectivity of the diffusive layer being layer being high or low as is required for the screen to operate. This replacement of the bead layer represents more designs. The diffusive layer would be chosen from the class of materials discussed in the background section.

In the seventeenth design of the proposed invention the image is projected with light onto any of the screens in the previous designs with an additional thin layer in the screen placed between the polarizing layer and the source of the projected light. This additional thin layer must be composed of a material such as mylar which randomizes the polarization of light which transmits through it. Referring to FIG. 13, this design consists of a multi-layered screen, 311, with an additional layer, 312, which randomizes polarization and is positioned between the source of projected light, 313, and the polarizer which is within the layer, 311. The multi-layered screen is any of the screens defined in the above designs, or equivalently any of screens one through ten.

The eighteenth design of the proposed invention is a derivative application of the fundamental three dimensional quality of the images produced. FIG. 13a shows a perspective view of the basic components of this design. They consist of a means of projecting an image, 314, from a first medium, such as video, onto a screen 315, and a means of recording an image, 316, onto a second medium such as film. The means of producing the image on the screen could be any of the invention designs described. Thus the three dimensional quality of the image can be transferred to a second medium.

OPERATION OF THE INVENTION

Figure 1:
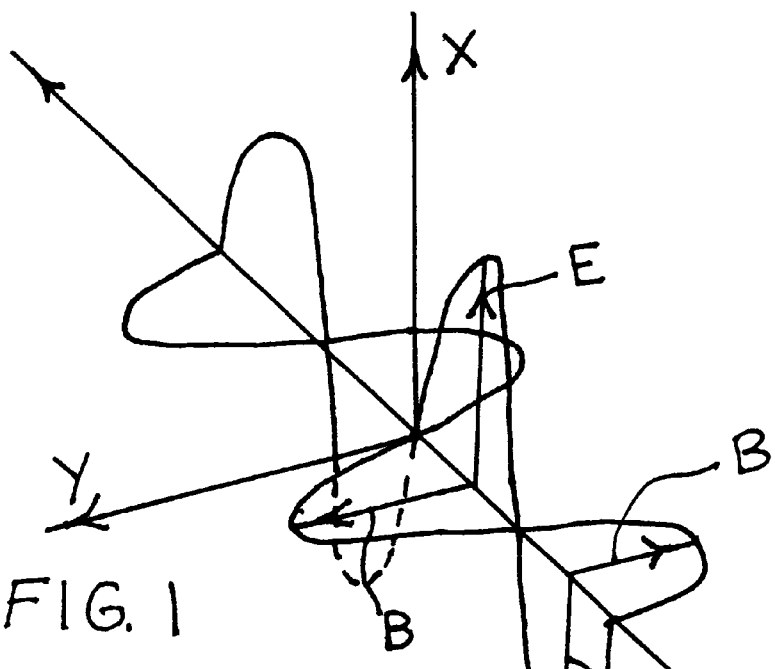
FIG. 1 Travelling electromagnetic wave
Figure 1A:
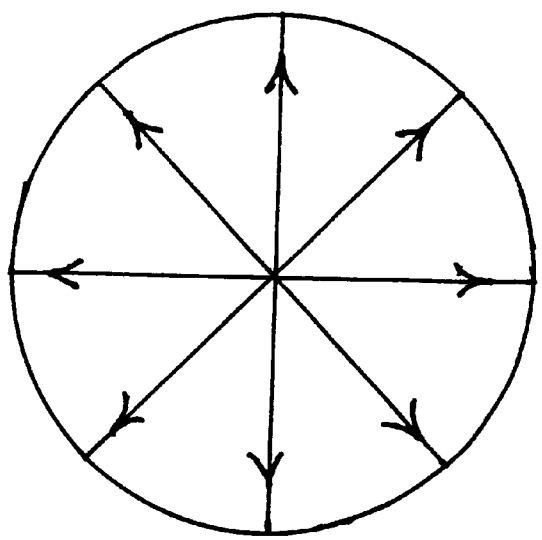
FIG. 1A Some possible polarization states of the electric field in an electromagnetic wave FIG. 1B Vector components of the electric field.
Figure 1B:
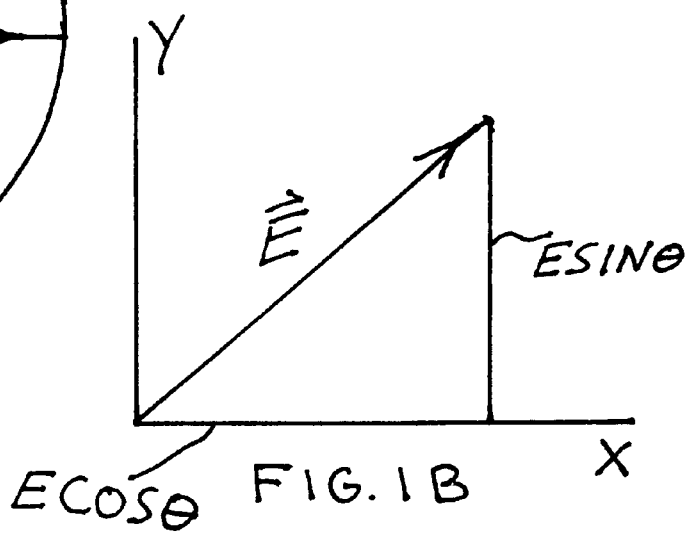
Figure 2:
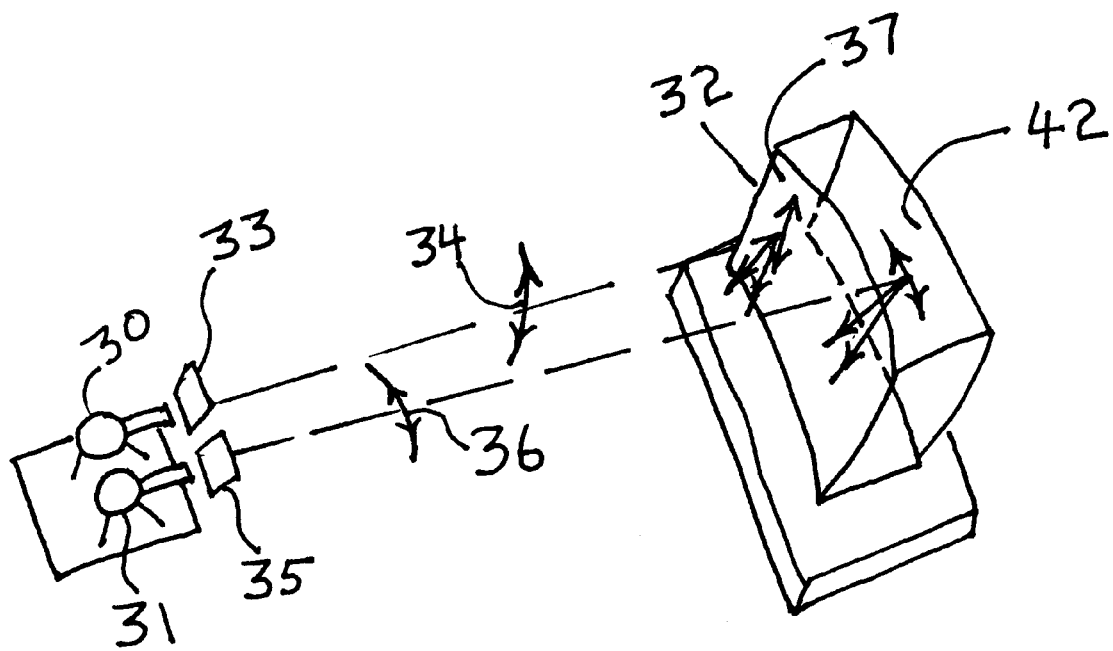
FIG. 2 (Prior Art) A perspective view of a dual screen three dimensional display system, U.S. Pat. No. 3,248,165 to Marks et al.
Figure 2A:
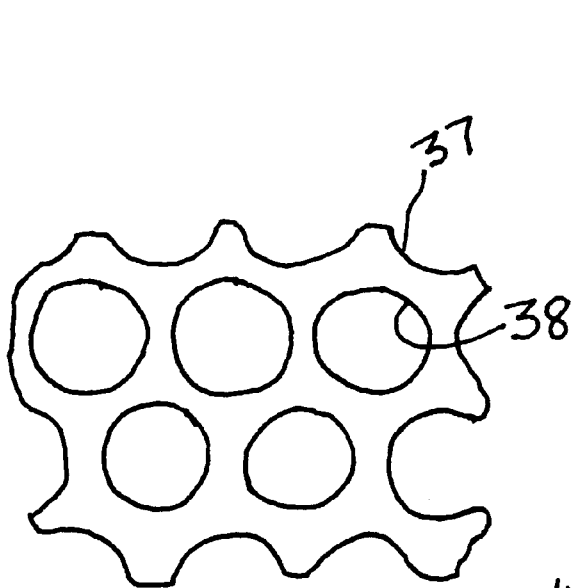
FIG. 2A (Prior Art) View of holes in foreground screen from Marks' system
Figure 2B:
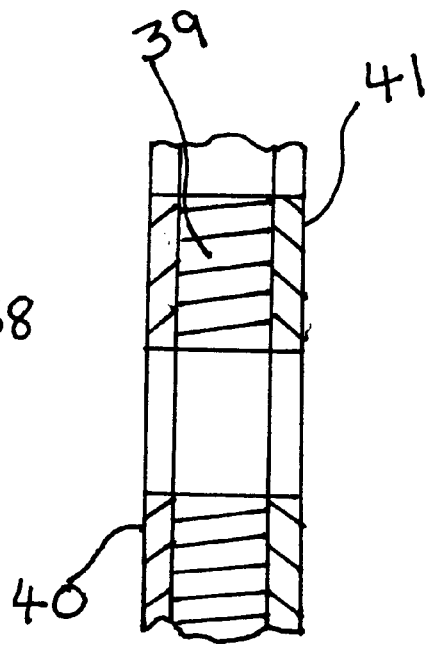
FIG. 2B (Prior Art) Cross section of foreground screen from Marks' system
Figure 2C:
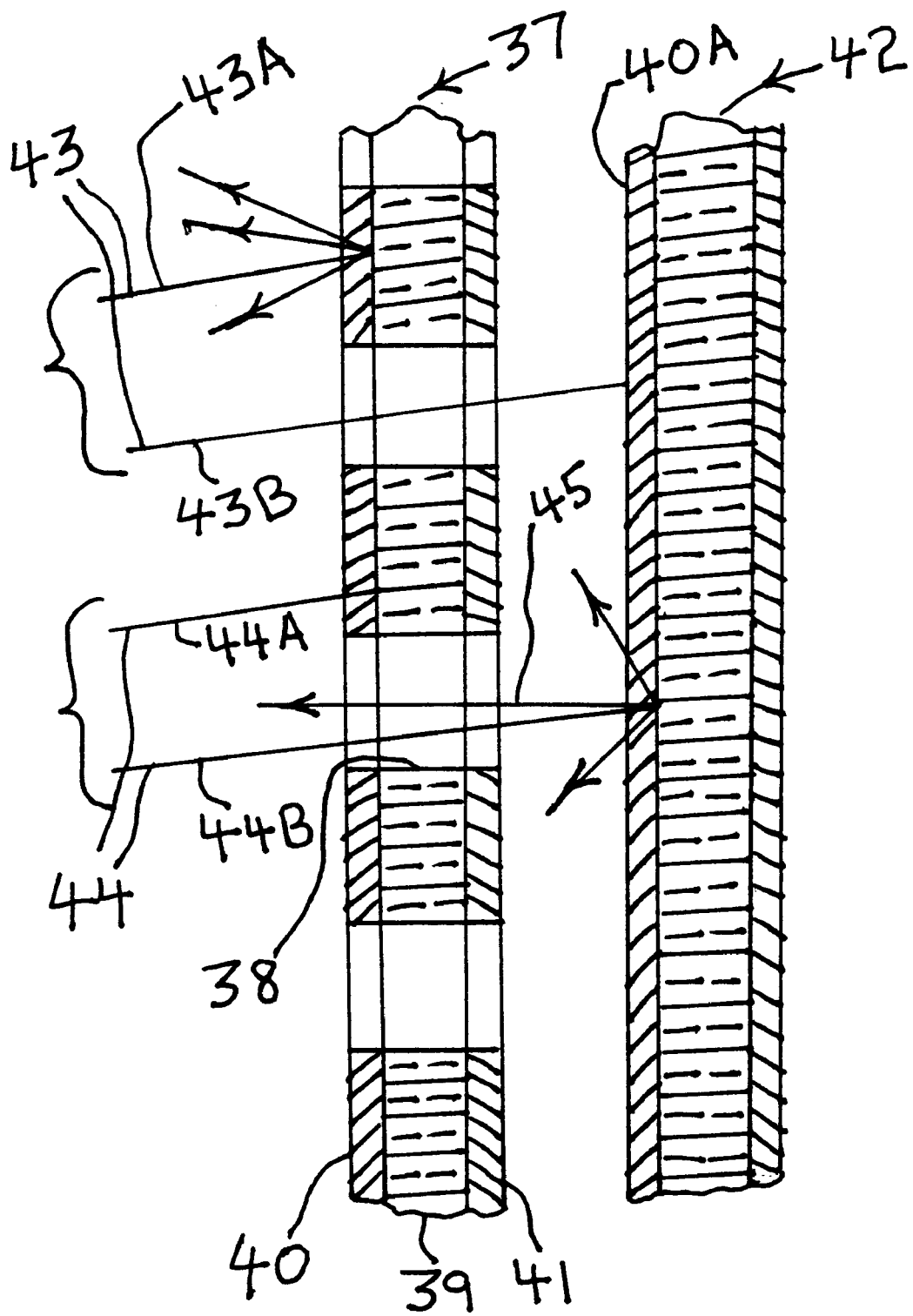
FIG. 2C (Prior Art) Schematic diagram illustrating the operation of Marks' system FIG. 2D (Prior Art) Close up cross sectional view of the structure of the solid part of the foreground screen and the background screen from Marks' system FIG. 3 (Prior Art) Perspective view of the components comprising the three dimensional display system, U.S. Pat. No. 5,469,295, Burke I system.
Figure 2D:
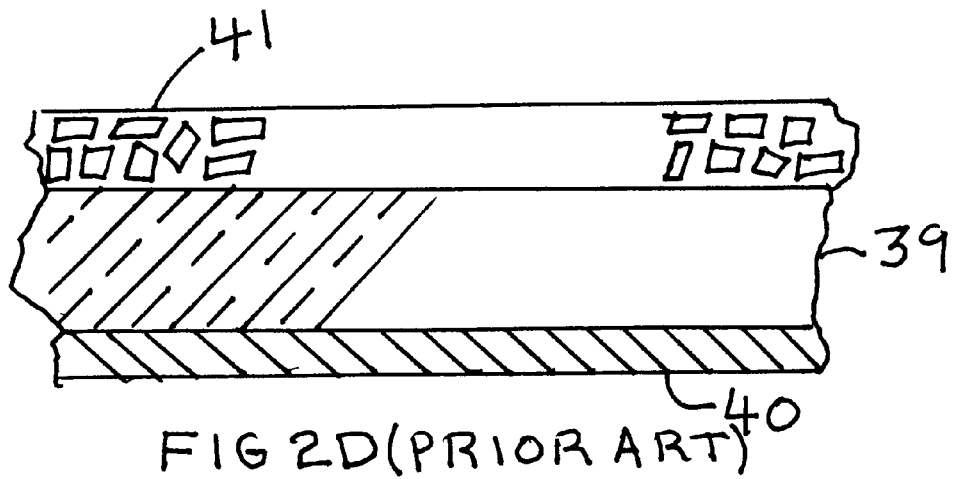
Figure 3:
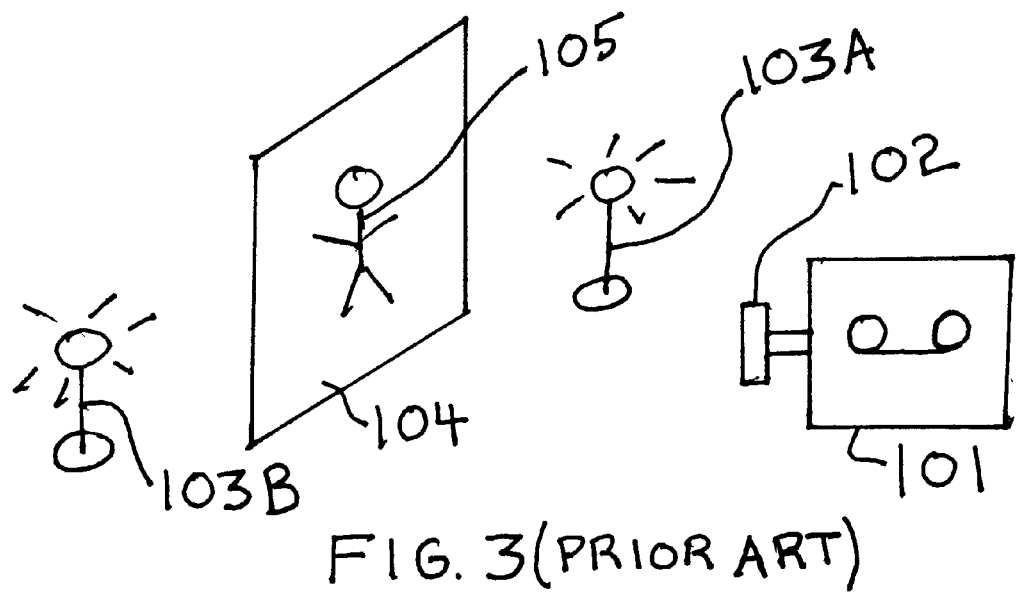
Figure 4:
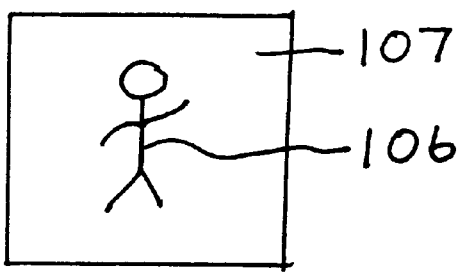
FIG. 4 (Prior Art) A frame of film or video containing an isolated image of a subject against an opaque background for the Burke I system.
Figure 5:
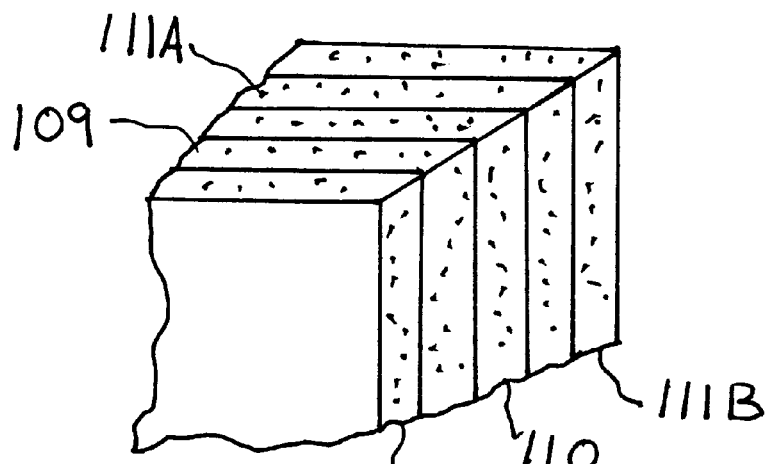
FIGS. 5,6 (Prior Art) Perspective view of the layers that constitute the screens in system, U.S. Pat No. 5,469,295.
Figure 6:
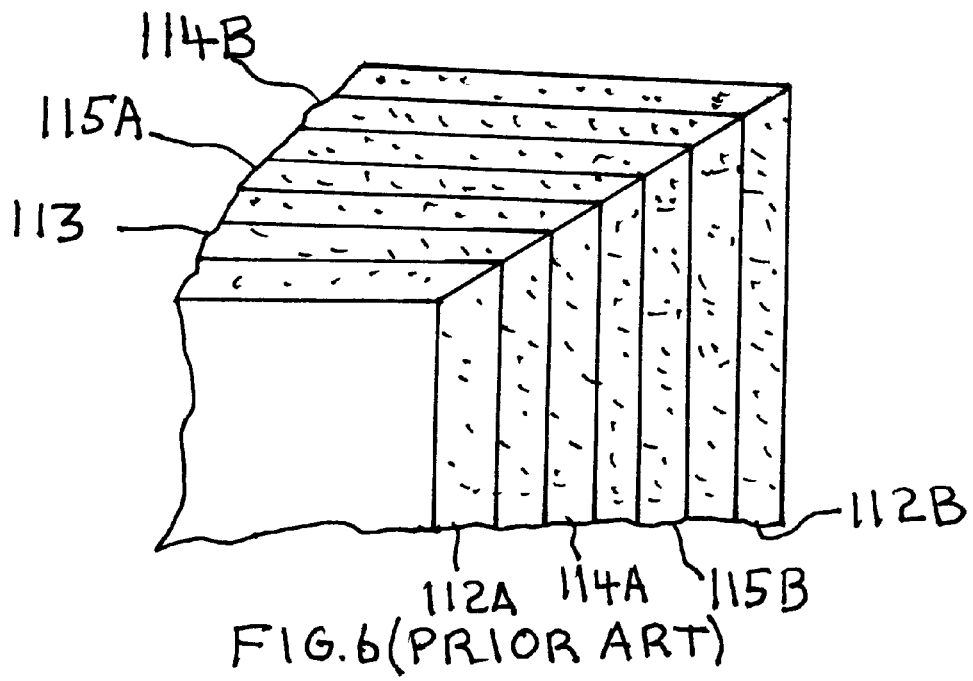
Figure 7:
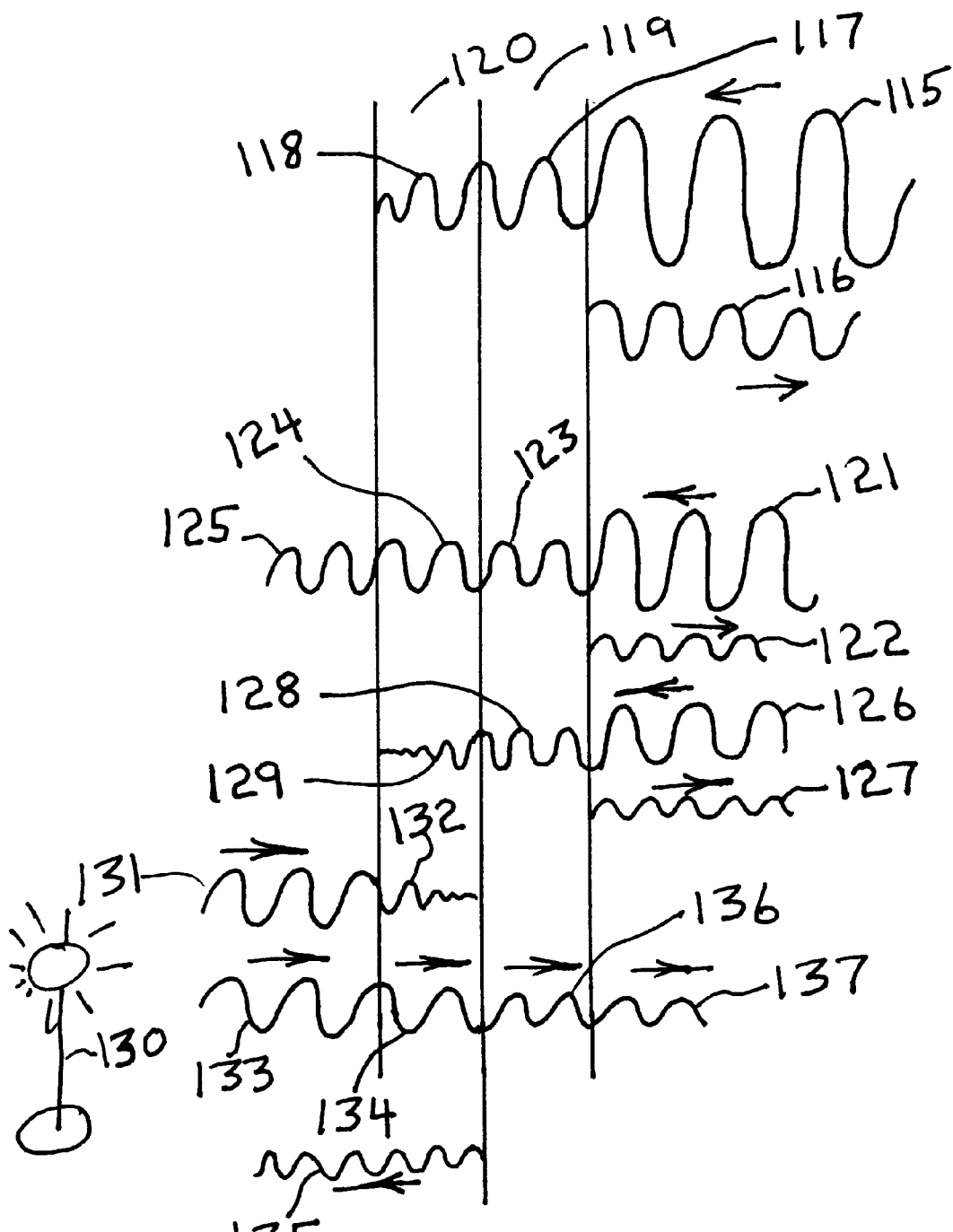
FIG. 7 (Prior Art) Schematic diagram illustrating the operation of the proposed three dimensional display, Burke I system.

In all of the discussion on operation I shall use a schematic diagram as was done to describe the Burke I system in the background section, such diagram being FIG. 7. In speaking on the operative function of the different screen designs I shall not include substrates or binding layers since these are optically inert, and serve only as a means for binding the optically active layers together.

All the screens in the different designs of the proposed invention are partially transparent to the naked eye. If an observer is on one side of the screen, objects on the opposite side of the screen are sources of unpolarized light and no matter what type of polarizer is in the screen part of the unpolarized light will transmit through the screen making the screen partially transparent and the object visible. This is a reiteration of the transparent property of the screens in the Burke I system and is discussed in the prior art section and described in FIG. 7.

All of the designs of the proposed invention have screens which stop, reflect and or transmit the images projected onto them. Thus the projected images are seen on the screen.

All of the designs of the proposed invention are different generally from the Burke I system in that they produce a three dimensional image of an entire scene. Specific differences include the exact structure of the screen, the polarization or mixture of polarization states of the projected lights, and the amount of positions from which the images may be viewed by an observer.

Figure 14:
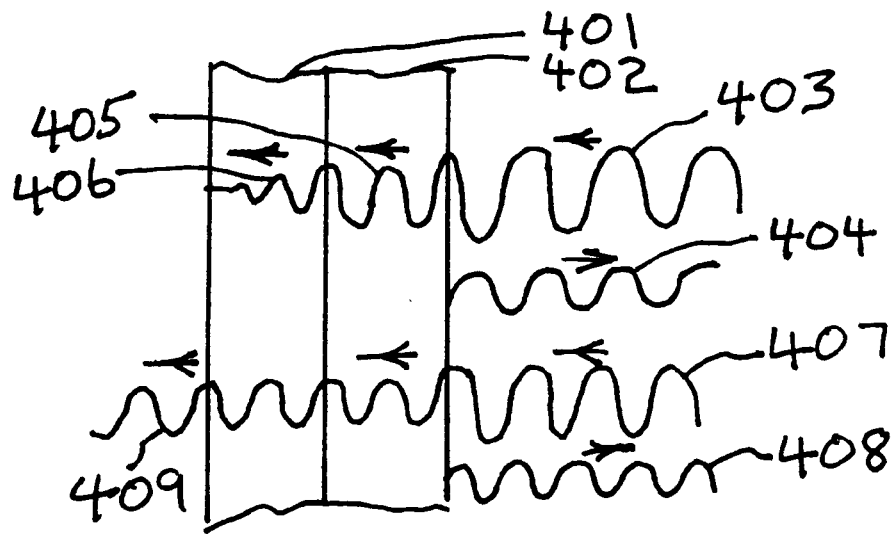
FIGS. 14–31 Schematic diagrams illustrating the operation of the different designs of the proposed invention.

The operation of the first design of the proposed invention is shown schematically in FIG. 14, to which I now refer. The image is projected with light onto a screen with a polarizing layer, 401, and a partially reflective and transparent layer, 402. The projected light is represented by the two waves, 403 and 407. A portion of the projected wave, 403, reflects off of the layer, 402, and is the reflected wave, 404. A portion of the projected wave 407, reflects off of the layer 402, and is the reflected wave, 408. The reflected waves, 404 and 408, are the reflected image seen on the screen by an observer on the same side of the screen as the projector. The projected wave, 403, has a polarization sense equal to the absorption sense of the polarizing layer, 401. A portion of the projected wave, 403, transmits through the layer, 402, and is the transmitted wave, 405. The transmitted wave, 405, passes into the polarizing layer, 401, where it becomes the absorbed wave, 406. The projected wave, 407, has a polarization sense equal to the transmission sense of the polarizing layer, 401. A portion of the projected wave, 407, transmits through the layer, 402, and through the polarizing layer, 401, and is the transmitted wave, 409. The transmitted wave, 409, is the transmitted image seen on the screen by an observer on the opposite side of the screen to that of the projector. This is different from the Burke I system in that the projected light has two states of polarization instead of one, and the image can be viewed from either side of the screen instead of just the front side of the screen facing the projector.

Figure 15:
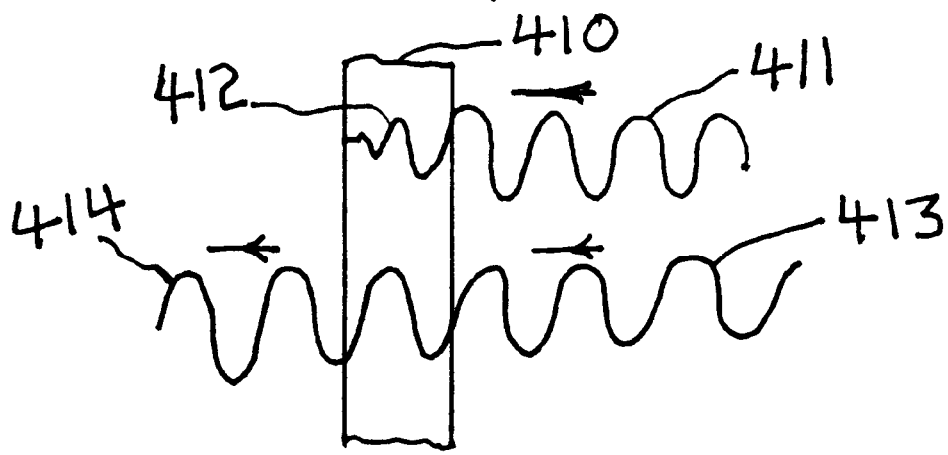

The operation of the second design of the proposed invention is shown schematically in FIG. 15 to which I now refer. The image is projected with light onto a screen with a polarizing layer, 410. The projected light is represented by the two waves 411 and 413. The projected wave, 411, has a polarization sense equal to the absorption sense of the polarizing layer, 410, and when it enters the polarizing layer it becomes the absorbed wave, 412. The projected wave, 413, has a polarization sense equal to the transmission sense of the polarizing layer 410, and when it enters the polarizing layer it transmits through it and becomes the transmitted wave, 414. The transmitted wave, 414, is the transmitted image seen on the screen by an observer on the opposite side of the screen to that of the projector. This is different from the Burke I system in that the partially reflective layer in the screen has been eliminated and this is a rear projection design as opposed to front projection.

Figure 16:
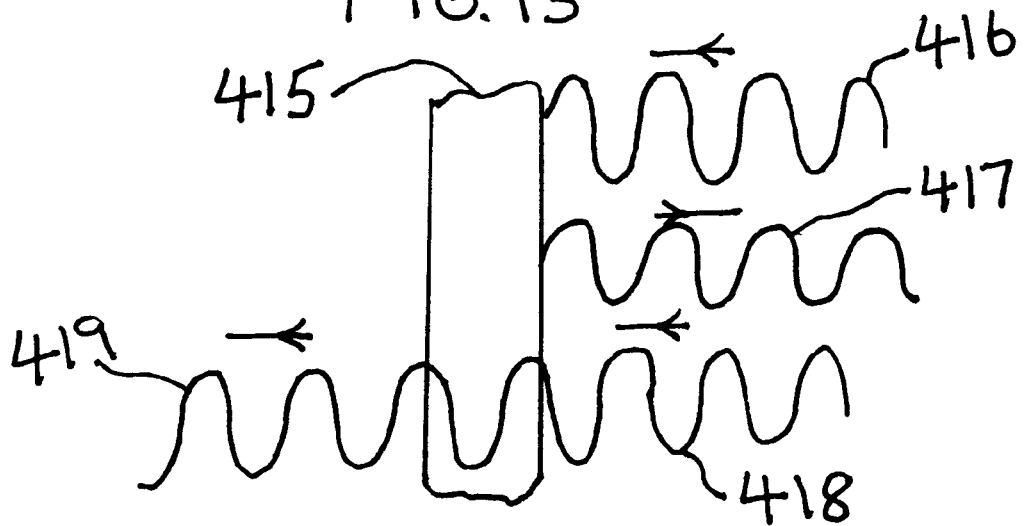

The operation of the third design of the proposed invention is shown schematically in FIG. 16 to which I now refer. The image is projected with light onto a screen with a metal polarizing layer, 415. The projected light is represented by the two waves 416 and 418. The projected wave, 416, has a polarization sense equal to the reflection sense of the metal polarizing layer, 415, and when it hits the metal polarizer, it reflects off of it and is the reflected wave, 417. The reflected wave, 417, is the reflected image seen on the screen by an observer on the same side of the screen as the projector. The projected wave, 418, has a polarization sense equal to the transmission sense of the metal polarizer and it transmits through the metal polarizer and is the transmitted wave, 419. The transmitted wave, 419, is the transmitted image seen on the screen by an observer on the opposite side of the screen to that of the projector. This is different from the Burke I system in that: the projected light has two states of polarization instead of one, the screen has a metal polarizer and no reflective layer, and the image can be seen from either side of the screen.

Figure 17:
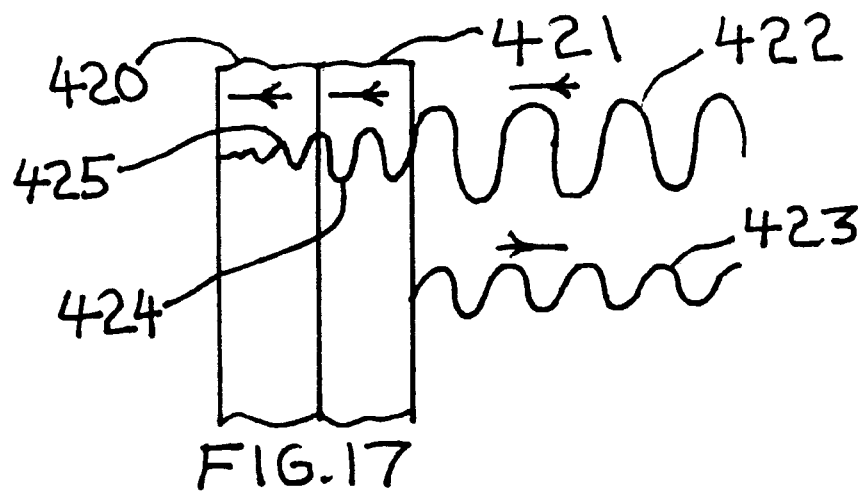

The operation of the fourth design of the proposed invention is shown schematically in FIG. 17 to which I now refer. The image is projected with light onto a screen with a polarizing layer, 420, and a partially reflective and transparent layer, 421. The projected light is represented by the wave, 422, and is fully polarized with a polarization sense equal to the absorption sense of the polarizing layer 420. A portion of the projected wave, 422, reflects off the layer, 421, and is reflected wave, 423. The reflected wave, 423, is the reflected image seen on the screen by an observer on the same side of the screen as the projector. A portion of the projected wave, 422, transmits through the layer, 421, and is the transmitted wave, 424. The transmitted wave, 424, passes into the polarizing layer, 420, where it becomes the absorbed wave, 425. This is different than the Burke I system only in the structure of the screen, not in it's operative function. Referring to the section titled, "Description of the Invention", it can be seen that a substrate and binding layer have been eliminated and the partially reflective and transparent layer has been deposited directly onto the polarizing layer. This is possible with the right choice of materials and method of deposition. This is an improvement of the Burke I system in that it simplifies manufacturing. Further this design claims a three dimensional image of an entire scene as opposed to the Burke I system. The reason for this claim is shown in the section on the theory of the invention, and is unobvious.

Figure 18:
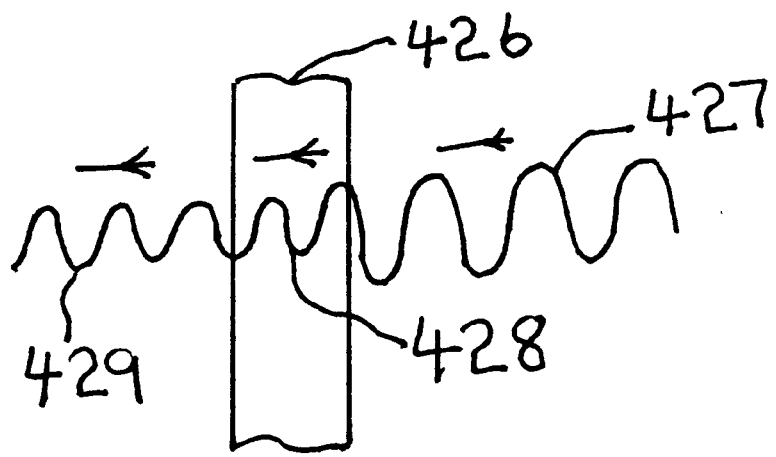

The operation of the fifth design of the proposed invention is shown schematically in FIG. 18 to which I now refer. The image is projected onto a screen with a polarizing layer, 426. The projected light is represented by the wave, 427, and is fully polarized with a polarization sense equal to the absorption sense of the polarizer. The thickness of the polarizing layer, 426, is thin enough to absorb only part of the projected wave, 427. The projected wave, 427, moves into the polarizing layer, 426, and becomes a partially absorbed wave, 428. That part of the light that is not absorbed gets through the polarizer and becomes a transmitted wave, 429. The transmitted wave, 429, is the transmitted image and is seen on the screen by an observer on the side opposite to that of the projector. This is different than the Burke I system in that: the thickness of the polarizer is thin enough only to absorb part of the projected light. The partially reflective and transparent layer has been eliminated. The image is viewed from the side of the screen opposite to that of the projector making this a rear projection system as opposed to a front projection system.

Figure 19:
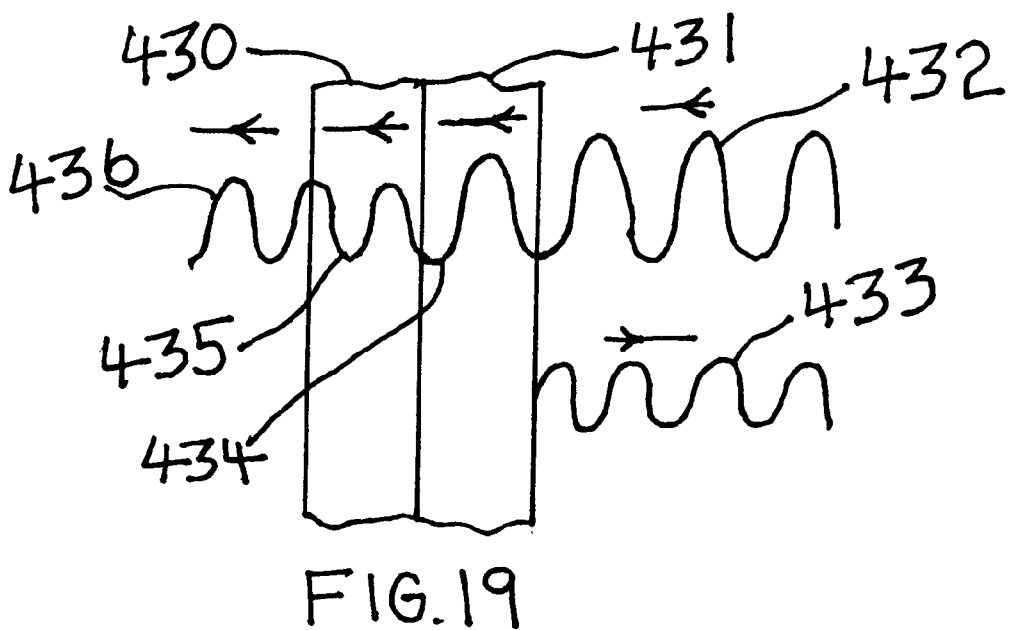

The operation of the sixth design of the proposed invention is shown schematically in FIG. 19, to which I now refer. The image is projected with light onto a screen with a polarizing layer, 430, and a partially transparent and reflective layer, 431. The projected light is represented by the wave, 432 and is fully polarized with a polarization sense equal to the absorption sense of the polarizing layer 430. A portion of the projected wave, 432, reflects off the layer, 431, and is the reflected wave, 433. The reflected wave, 433, is the reflected image seen on the screen by an observer on the same side of the screen as the observer. A portion of the projected wave, 432, moves through the layer, 431, and becomes a transmitted wave, 434, which then moves into the polarizing layer, 430, and becomes partially absorbed wave, 435. The light becomes partially absorbed because it has a polarization sense equal to the absorption sense of the polarizer. The thickness of the polarizing layer, 430, is thin enough so that it only absorbs part of the projected light that enters into it. The part of the projected light that enters into the polarizing layer, 430, and is not absorbed, transmits through the screen and is the transmitted wave, 436. The transmitted wave, 436, is the transmitted image seen on the screen by an observer on the side of the screen opposite to that of the projector. This is different from the Burke I system in that only part of the projected light whose polarization sense is equal to the absorption sense of the polarizer is absorbed and the image can be seen from either side of the screen.

Figure 20:
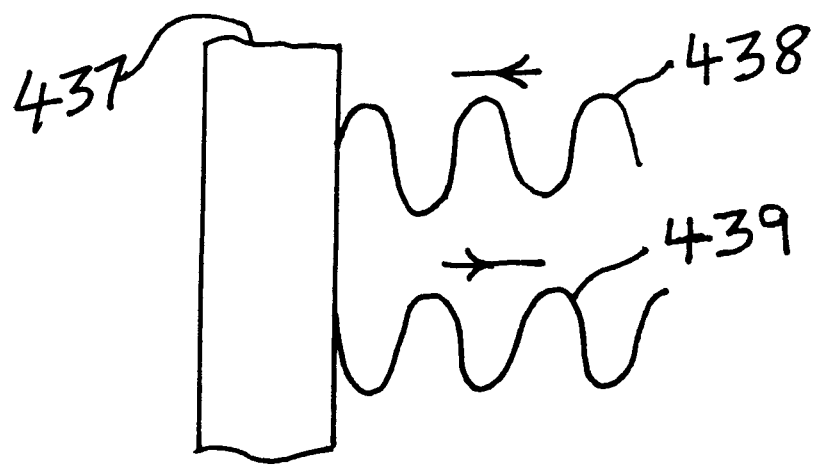

The operation of the seventh design of the proposed invention is shown schematically in FIG. 20, to which I now refer. The image is projected with light onto a screen with a metal polarizing layer, 437. The projected light is fully polarized with a polarization sense equal to the reflection sense of the metal polarizer and is represented by the wave, 438. The projected wave, 438, hits the metal polarizer and is completely reflected and becomes a reflected wave, 439, which is the reflected image seen on the screen by an observer on the same side of the screen as the projector. This is different from the Burke I system in that the partially transparent and reflective layer has been eliminated and the polarizer is a metal polarizer.

Figure 21:
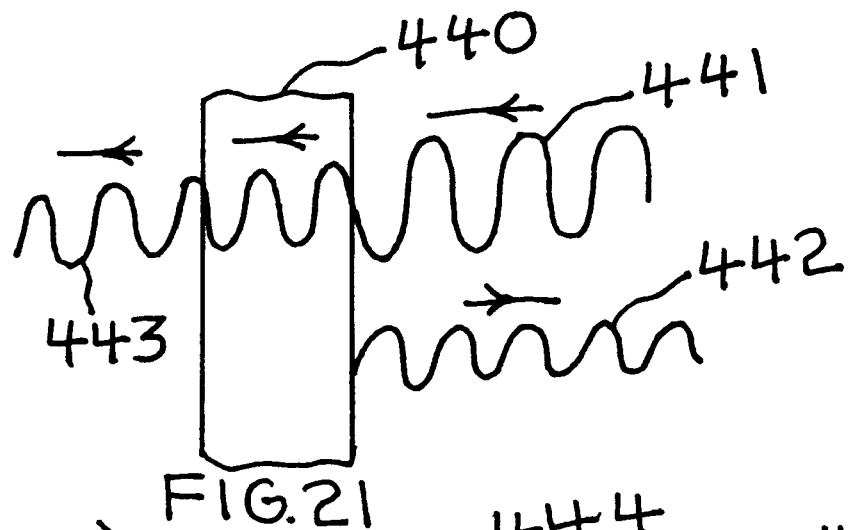

The operation of the eighth design of the proposed invention is shown schematically in FIG. 21. The image is projected with light onto a screen with a metal polarizing layer, 440. The projected light is completely polarized with a polarization sense equal to the reflection sense of the polarizer and is represented by the wave, 441. A portion of the projected wave is reflected and is the reflected wave, 442, which is the reflected image that is seen on the screen by an observer on the same side of the screen as the projector. The thickness of the metal polarizing layer, 440, is thin enough to allow some of the projected light to pass through it. A portion of the projected wave, 441, transmits through the metal polarizing layer, 440, and is the transmitted wave, 443. The transmitted wave, 443, is the transmitted image that is seen on the screen by an observer on the opposite side of the screen to that of the projector. This is different from the Burke I system in that: the partially transparent and reflective layer has been eliminated, the polarizer is a metal polarizer, and the image can be seen from either side of the screen.

Figure 22:
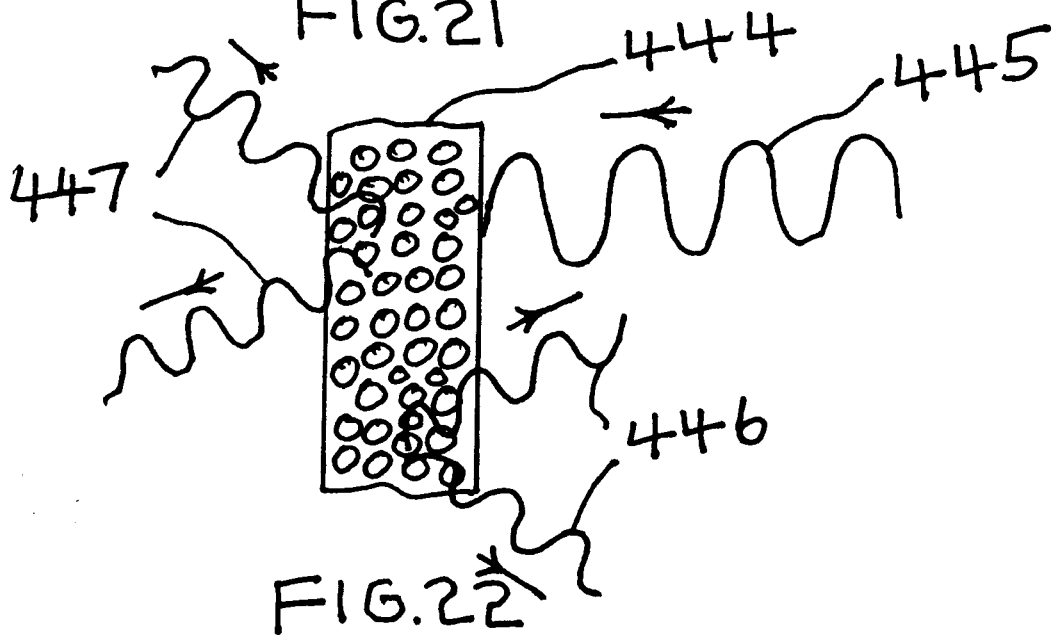

The ninth through sixteenth designs of the proposed invention all have a new layer which is transparent and reflective or transmissive. A perspective view of the new layer is shown in FIG. 22. It is composed of transparent beads less than 1000 microns in size, embedded in a transparent base whose index of refraction is different from that of the beads. This new layer shall be referred to as the bead layer. Referring to FIG. 22 when a light wave, 445, is incident on the layer, 444, reflected waves, 446 and transmitted waves, 447, emanate from the screen at a diversity of angles making the image visible on the screen from a diversity of viewing angles.

The beads, when combined with a polarizer, increase the three dimensional quality of the image. When a layer with beads is not combined with a polarizer the increased three dimensional effect disappears. The enhanced three dimensional quality will be discussed further in the section on the theory of the invention.

The bead layer can be replaced with a partially diffusive layer with the necessary transparency and reflectivity. The partially diffusive layer does not add as much three dimensional quality to the image as does the bead layer but it does scatter the image at a diversity of angles. When the bead layer is replaced with a partially diffusive layer the description of the operation of the invention is the same, so I do not repeat but rather describe only the operative function with the presence of the bead layer in designs nine through sixteen.

Referring again to FIG. 22, waves emanating at a diversity of angles shall be represented schematically like the waves 446 and 447.

Figure 23:
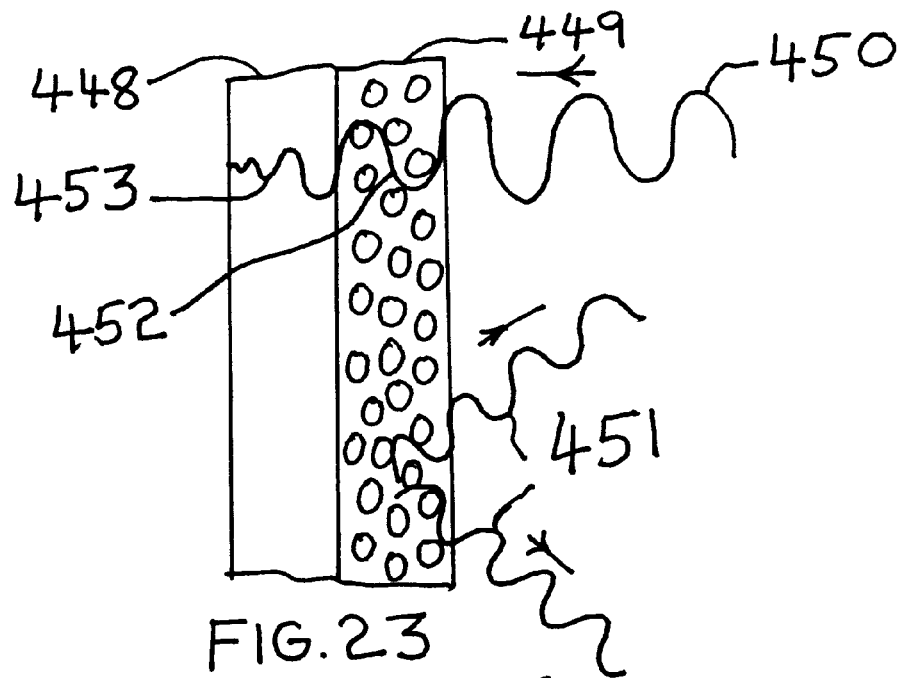

The operation of the ninth design of the proposed invention is shown schematically in FIG. 23, to which I now refer. The image is projected with light onto a screen with a polarizing layer, 448, and a partially transparent and reflective bead layer, 449. The projected light is fully polarized with a polarization sense equal to the absorption sense of the polarizer and is represented by the wave, 450. A portion of the projected wave, 450, is reflected off of the bead layer, 449, and is the reflected wave, 451. The reflected wave, 451, is the reflected image that is seen on the screen by an observer on the same side of the screen as the projector. A portion of the projected wave, 450, transmits through the bead layer and is the transmitted wave, 452, which then passes into the polarizing layer and becomes the absorbed wave, 453. this is different than the Burke I system in that the partially reflective and transparent layer is replaced with the bead layer.

Figure 24:
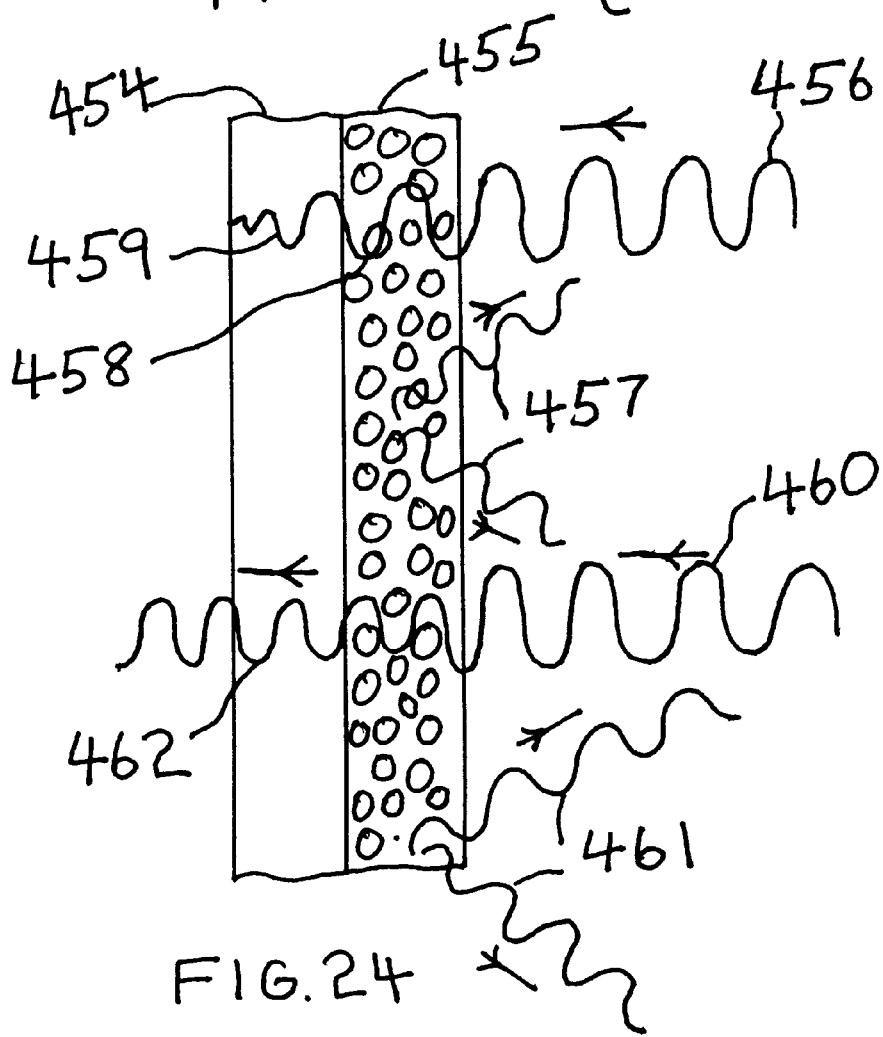

The operation of the tenth design of the proposed invention is shown schematically in FIG. 24, to which I now refer. The image is projected with light onto a screen with a polarizing layer, 454, and a partially reflective and transparent bead layer, 455. The projected light is represented by the two waves, 456 and 460. A portion of the projected wave, 456, reflects off the bead layer, 455, and is the reflected wave, 457. A portion of the projected wave, 460, is reflected off the bead layer, 455, and is the reflected wave, 461. The reflected waves 457 and 461 are the reflected image seen on the screen by an observer on the same side of the screen as the projector. The projected wave, 456, has a polarization sense equal to the absorption sense of the polarizing layer 454. A portion of the projected wave, 456, transmits through the bead layer, 455, and is the transmitted wave, 458. The transmitted wave, 458, passes into the polarizing layer, 454, and becomes the absorbed wave 459. The projected wave, 460, has a polarization sense equal to the transmission sense of the polarizing layer, 454. A portion of the projected wave, 460, transmits through the bead layer 455 and through the polarizing layer 454, and is the transmitted wave, 462. The transmitted wave, 462, is the transmitted image seen on the screen by an observer on the opposite side of the screen to that of the projector. This is different from the Burke I system in that the partially transparent and reflective layer is replaced with a partially transparent and reflective bead layer, and the image can be seen from either side of the screen.

Figure 25:
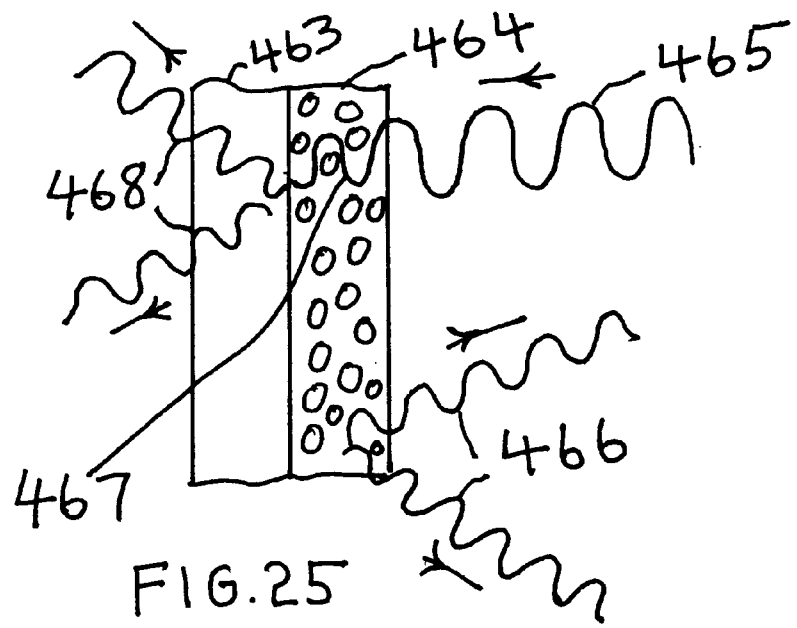

The operation of the eleventh design of the proposed invention is shown schematically in FIG. 25, to which I now refer. The image is projected with light onto a screen with a polarizing layer 463, and a partially reflective and transparent bead layer, 464. The projected light is represented by the wave, 465, and a portion of it reflects off the bead layer, 464, and is the reflected wave, 466. The reflected wave, 466, is the reflected image seen on the screen by an observer on the same side of the screen as the projector. The projected wave, 465, is fully polarized with a polarization sense equal to the absorption sense of the polarizing layer 463. A portion of the projected wave, 465, transmits through the bead layer 464, and is the transmitted wave, 467, which then moves into the polarizing layer, 463, and becomes the partially absorbed wave, 468. The wave 468 is only partially absorbed because the polarizing layer, 463, is thin enough to allow some of the projected light that enters it to get through it and become the transmitted wave, 469. The transmitted wave, 469, is the transmitted image seen on the screen by an observer on the opposite side of the screen to that of the projector. This is different from the Burke I system in that: the partially transparent and reflective layer is replaced with a partially reflective and transparent bead layer; the polarizer is thin enough so that some of the projected light with polarization sense equal to the absorption sense of the polarizer is able to transmit through the polarizer and; the image can be seen from either side of the screen.

Figure 26:
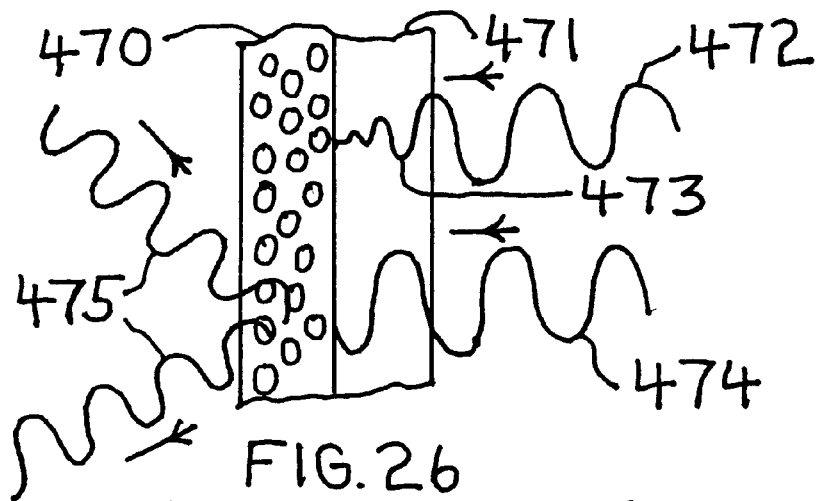

The operation of the twelfth design of the proposed invention is shown schematically in FIG. 26, to which I now refer. The image is projected with light onto a screen with a transparent bead layer, 470, and a polarizing layer, 471. The beads in the bead layer, 470, are composed of a material with negligible reflective properties. The projected light is represented by the two waves, 472 and 474. The projected wave, 472, has a polarization sense equal to the absorption sense of the polarizing layer, 471, and when it enters the polarizer it becomes the absorbed wave, 473. The projected wave, 474, has a polarization sense equal to the transmission sense of the polarizing layer, 471, thus the projected wave, 474, transmits through the polarizing layer, 471, and the bead layer, 470, becoming the transmitted wave 475. The transmitted wave, 475, is the transmitted image seen on the screen by an observer on the opposite side of the screen to that of the projector. This is different from the Burke I system in that the bead layer has been introduced; this is a rear projection system instead of front, the projected light has two polarization states instead of one.

Figure 27:
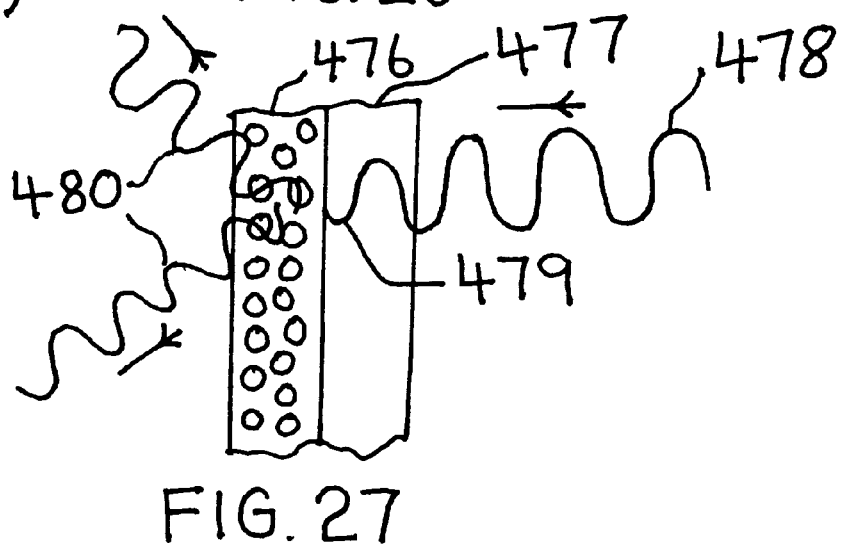

The operation of the thirteenth design of the proposed invention is shown schematically in FIG. 27 to which I now refer. The image is projected with light onto a screen with a transparent bead layer, 476, and a polarizing layer, 477. The transparent bead layer, has beads composed of a material with negligible reflectivity. The polarizing layer, 477, is thin enough so that some of the projected light with polarization sense equal to its absorption sense transmits through it. The projected light is fully polarized with a polarization sense equal to the absorption sense of the polarizing layer, 477, and is represented by the wave, 478. When the projected wave, 478 enters the polarizing layer, 477, it becomes the partially absorbed wave, 479, and what isn't absorbed transmits through the bead layer, 476, and becomes the transmitted wave, 480. The transmitted wave is the transmitted image seen on the screen by an observer on the opposite side of the screen to that of the projector. This is different from the Burke I system in that: the bead layer is introduced; the polarizing layer is thin enough to allow some of the projected light with polarization sense equal to its absorption sense, to transmit through it; and this is a rear projection system instead of front projection.

Figure 28:
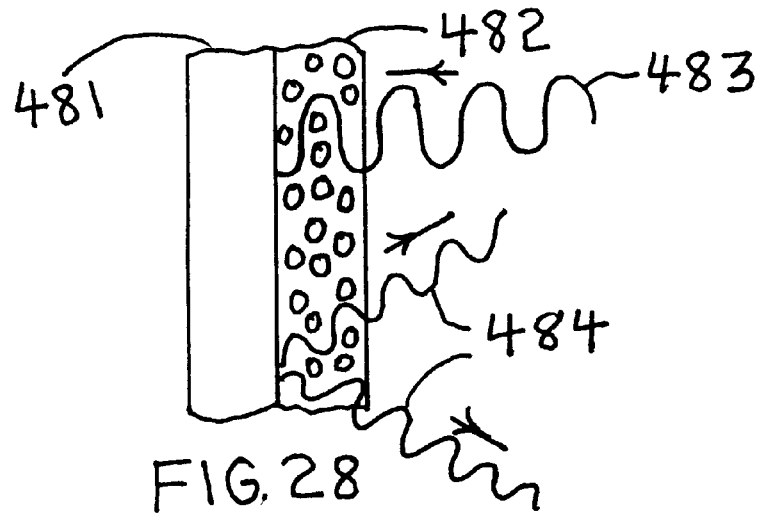

The operation of the fourteenth design of the proposed invention is shown schematically in FIG. 28 to which I now refer. The image is projected with light onto a screen with a metal polarizing layer, 481, and a transparent bead layer, 482, whose beads are composed of a material with negligible reflectivity. The projected light is fully polarized with a polarization sense equal to the reflection sense of the polarizing layer, 481, and is represented by the wave, 483. The projected wave, 483, transmits through the bead layer, 482, hits the metal polarizing layer, 483, is reflected and becomes the reflected wave, 484. The reflected wave, 484, is the reflected image that is seen on the screen by an observer on the same side of the screen as the projector. This is different than the Burke I system in that: the bead layer has been introduced; and the polarizer is a metal polarizer.

Figure 29:
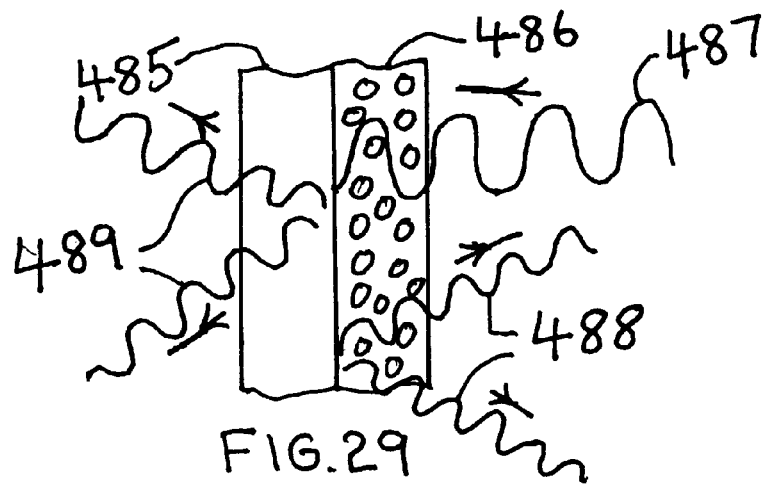

The operation of the fifteenth design of the proposed invention is shown schematically in FIG. 29 to which I now refer. The image is projected with light onto a screen with a metal polarizing layer, 485, and a transparent bead layer, 486. The metal polarizing layer, 485, is thin enough so that some of the projected light with polarization sense equal to the reflection sense of the polarizer will transmit through the metal polarizing layer, 485. The beads on the bead layer, 486, are composed of material with negligible reflectivity. The projected light is fully polarized with a polarization sense equal to the reflection sense of the metal polarizing layer, 485. The projected light is represented by the wave, 487, which transmits through the bead layer, 486, and hits the metal polarizing layer, 485. A portion of the projected wave, 487, reflects off the polarizing layer and is the reflected wave, 488 which is the reflected image seen on the screen by an observer on the same side of the screen as the projector. A portion of the projected wave, 487, transmits through the metal polarizing layer, 485, because the metal polarizing layer is thin enough to allow it, and becomes the transmitted wave, 489. The transmitted wave 489 is the transmitted image seen on the screen by an observer on the opposite side of the screen to that of the projector. The is different from the Burke I system in that; the bead layer has been introduced, the polarizer is a metal polarizer, and the image can be seen from either side of the screen.

Figure 30:
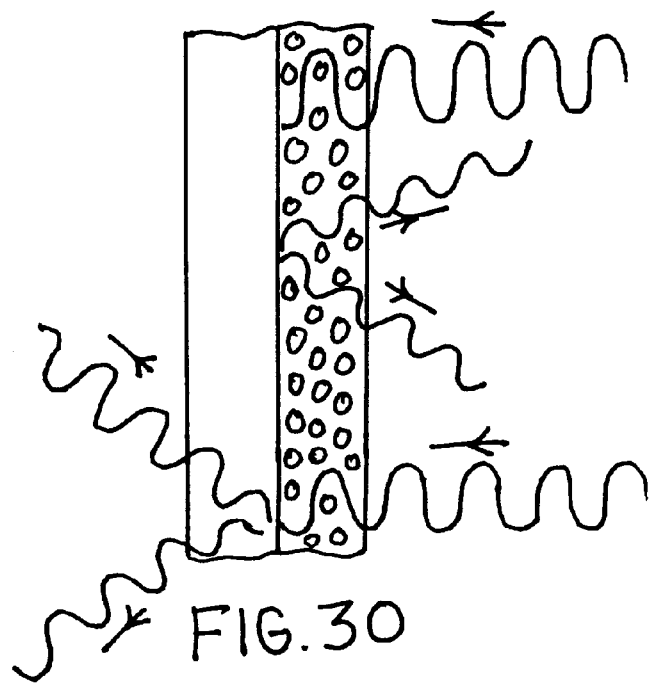

The operation of the sixteenth design of the proposed invention is shown schematically in FIG. 30 to which I now refer. The image is projected with light onto a screen with a metal polarizing layer, 490, and a transparent bead layer, 491. The beads in the bead layer are composed of a material with negligible reflectivity. The projected light is represented by the waves 492 and 494. The projected wave, 492, which has a polarization sense equal to the reflection sense of the metal polarizing layer 490 transmits through the bead layer, 491, is reflected off the metal polarizing layer, 490, and becomes the reflected wave, 493. The reflected wave, 493, is the reflected image seen on the screen by an observer on the same side of the screen as the projector. The projected wave, 494, which has a polarization sense equal to the transmission sense of the metal polarizing layer, 490, transmits through the bead layer, 491, and the metal polarizing layer, 490, and becomes the transmitted wave, 495. The transmitted wave, 495, is the transmitted image seen on the screen by an observer on the opposite side of the screen to that of the projector. This is different from the Burke I system in that: the bead layer has been introduced; the polarizer is a metal polarizer; the projected light has two polarization states instead of one; and the image can be seen from either side of the screen.

All of the above designs may have a thin layer of plastic material such as mylar added to on the screen and positioned between the polarizing layer and the source of the projected light. Such material randomizes the polarization of light which passes through it. For example, if linearly polarized light moves through a thin layer of mylar, unpolarized light emanates from the opposite side of the layer. Unpolarized light is, from the background section, an equal mixture of linearly polarized states or an equal mixture of circularly polarized states. Thus after moving through the mylar, part of the projected light will be stopped by the polarizer and seen on the screen no matter what its initial polarization was.

Figure 31:
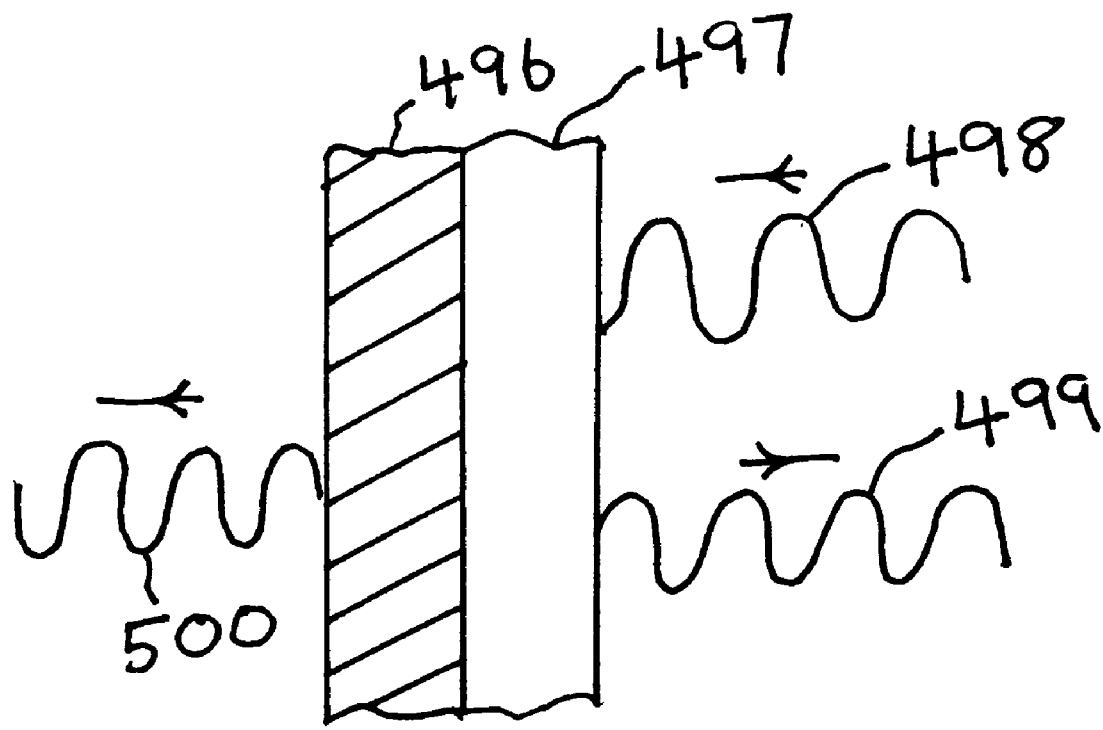

The operation of the seventeenth design of the proposed invention is shown schematically in FIG. 31 to which I now refer. An image is projected with light of any polarization or mixture of polarization states. The projected light is represented by the wave, 498, onto a screen composed of a layer, 496, which is a replicate of any of the screens of the previous designs and an additional layer, 497, which randomizes the polarization of light which passes through it. The projected wave, 498, passes through the layer 497 and becomes randomly polarized guaranteeing that part of it is stopped by the layer, 496, which contains a polarizer. Thus the projected light is guaranteed to be stopped and seen on the screen no matter what it's initial polarization. Part of the projected light is reflected, 499, or transmitted, 500, depending on the possible structures of the layer, 496, which are outlined above in designs one through sixteen. The reflected 499 or transmitted 500 waves are the images seen on the screen. This is different than the Burke I system in that: the projected light can have any polarization and the new layer of mylar has been introduced.

The eighteenth design consists of projecting an image from a first medium onto a screen by means of any of the designs outlined, and recording that image off the screen onto a second medium. The means of recording could be, for instance, a camera. Thus it becomes possible to transfer the three dimensional quality of the image onto the second medium. The operation of this eighteenth design consists of producing the image on the screen, the operation for which is outlined in the designs above, and recording the image with a visual recording apparatus positioned in front of or behind the screen at a position where the image of the projector itself is not recorded. One possible arrangement of projector, 314 screen 315 and visual recording apparatus 316 is shown in FIG. 13*a*. The difference between this design and the Burke I system is that this design produces a three dimensional image by the means outlined in the designs above, whose differences from the Burke I system have been itemized: and this system transfers the image to an additional visual recording medium. This application of the technology can be used to increase the three dimensional quality of any image.

THEORY OF THE INVENTION

The first part of the theory of the proposed invention is an unobvious evolution of the theory of the Burke I system which I now review. In the Burke I system an isolated image is displayed on a partially transparent sheet polarizing screen with real physical three dimensional reference objects in front of and behind the screen. The image on the screen appears to be three dimensional because you can see past it, thus causing the brain to paint a three dimensional image, in its subjective psychological visual space, of the image on the screen. The software in the brain is activated to paint in the dimensions and hence a three dimensional image is seen since we see what the brain paints in its subjective psychological visual space.

Figure 32:
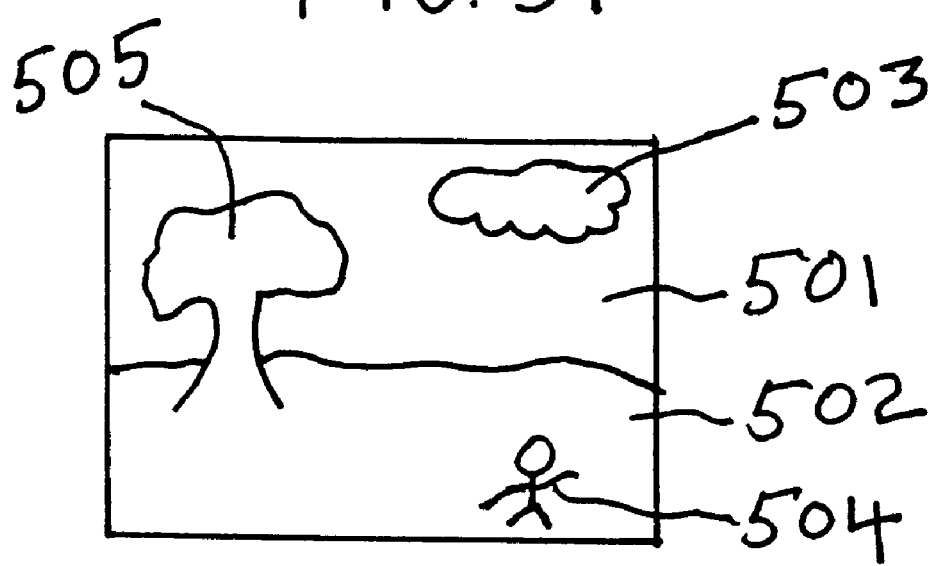
FIG. 32 Perspective view of an example of an entire scene on a screen of the proposed invention.

The proposed invention claims a three dimensional effect of an entire scene. An entire scene is however, just a summation of isolated objects. Each object has a boundary which constitutes its identity. Referring to FIG. 32 the scene is a summation of the five isolated objects: The sky, 501; the ground, 502; the cloud, 503; the person, 504; and the tree, 505. The boundary of the tree defines the tree. The boundary of the person defines the person. In real life along the boundary of an object there is a very small line of darkness. If you examine the person, 504, it is overlapping the ground, 502, but along the boundary line between the person and the ground there is no light emanating from the person or the ground and hence the infinitesimal line of darkness is defined. In real life this line of darkness is drawn in the psychological subjective visual space of the brain and the brain sees past the person, 504, and the ground 502, is seen to be behind the person. The infinitesimal line of darkness separates the two images. When the image of FIG. 32 is projected onto the screen the boundary line between different objects is a line of darkness but when you project a line of darkness the projector projects no light, and for the invention when no light is projected on the screen, the screen is transparent. Hence along the boundary line of each object in the scene there is a small line that the brain can see through. Each object has a boundary that we see past so each object has an imposed depth. If each object is seen to be three dimensional; the summation of all the objects is seen as three dimensional since what we see is a summation of all the waves emanating from the screen.

It is not obvious from the Burke I system that projecting an entire scene onto the screen will yield a three dimensional image because the theory of the Burke I system demands that the viewer be able to see past the object to stimulate the brain to paint the object in three dimensions in the subjective psychological visual space of the brain. When you project an entire scene onto the screens in the proposed invention the boundary lines between objects, which are lines of darkness, which are lines where no light is projected, which on the screens are lines of transparency, are small. The obvious conclusion is that when you fill the screen with an entire scene you won't be able to see past each object since it is touching the object next to it. However the boundary lines are small transparent lines on the screens and no light emanating from the boundary of object in the scene causes the software in the brain to paint in three dimensions in the subjective psychological visual space of the brain. Apparently this is true even if the boundary lines are very small even as small as the wavelength of visible light.

The point is that the boundary lines between objects in a scene on the screen are very small and the obvious conclusion is that the brain won't notice the boundary lines and will paint the image in two dimensions. This turns out not to be true. The unobvious turns out to be true. The unobvious being that if the boundary lines are transparent lines on the screen; even if these boundary lines are so small that they are not noticed by the conscious mind of the observer; if they are physically there the brain of the observer will paint the entire scene in three dimensions in the subjective psychological visual space of the brain, and hence the entire scene is seen in apparent three dimensions. This is a novelty because the proposed invention is projecting a two dimensional image on to a two dimensional screen which has previously been thought to produce a two dimensional image, according to the laws of optics.

Another way to state this theory of the boundary line is to talk about the shading used by painters. If you draw a circle on a page it looks two dimensional. However, if you shade the edge of the circle you fool the brain into thinking it can see past the circle and the circle begins to look like a ball. Thus a two dimensional object begins to appear three dimensional. The proposed invention, by making the boundary lines between objects in a scene transparent, produces the two dimensional images on the screen with a type of optical shading. The brain thinks it can see past the boundary of each object because it can literally see past the boundary because the boundary lines are transparent, thus the boundaries are shaded and the objects look three dimensional. That is to say the apparent shading makes the brain paint the objects in apparent three dimensions in its subjective psychological visual space.

In conventional display systems such as the television, computer monitor, or projection displays, the boundary lines between objects are not reproducing the lines of darkness and do not allow one to see past the objects through these boundary lines; hence these displays appear to be two dimensional with less depth.

In the proposed invention the mention of reference objects have been eliminated because they are always present whether they are the floor in front of and behind the screen or the molecules of air in front of and behind the screen. It is the theory of this invention that the subconscious brain can see the difference between pure vacuum and air since light does scatter off of air molecules and in the strictest sense an air molecule constitutes an object with respect to light since an air molecule has a finite scattering cross section for visible light.

The second part of the theory of the proposed invention is related to the bead layer. The introduction of the bead layer increases the effective surface area of the screen.

The projected image is partially transmitting or reflecting off of the surface of each bead. If the beads are spherical each bead has a surface area of $4\pi r^2$ where, r, is the radius of each spherical bead. The effective area on which the image is seen is equal to the summation of the areas of each bead in the bead layer. This effective area, A, is the number of beads in the bead layer times the area of each bead. The number of beads, N, is equal to the volume, V, of the bead layer divided by the volume of each bead, where r, is the radius of each bead. This is represented by equation (1)

$$N = \frac{V}{\frac{4}{3}\pi r^3} \quad (1)$$

The surface area of each bead, a, is given by equation (2)

$$a = 4\pi r^2 \quad (2)$$

where, r, is again the radius of each bead. The effective surface area, A, is the number of beads, N, times the area of each bead, a, and is represented by equation (3).

$$A = Na \quad (3)$$

Plugging into equation (3) expressions for, N, and, a, from equations (1) and (2) respectively yields a new expression for A, and is represented in equation (4)

$$A = V/3r \quad (4)$$

Where, again, V is the volume of the bead layer, and, r, is the radius of each bead. For a screen that is one square meter and a bead layer with a thickness of one millimeter, the volume of the bead layer is $0.001$ m$^3$. If the radius of the beads is one micron the effective area given by equation (4) is 333 m$^2$. The area of the screen defined by its boundary is only one square meter, this being one meter times one meter if the screen is a square with sides having a length of one meter. This real area of the screen is found by multiplying the sides which constitute the boundary of the screen. When the brain sees the boundary of the screen it interprets the area of the screen as being one meter times one meter which is one square meter. However, the brain sees images emanating off of the screen from an effective area of three hundred and thirty three square meters and interprets this effective increase in area as depth. In other words the effective area being larger than the area defined by the boundary of the screen, causes the software in the brain to paint the images on the screen in three dimensions in the brain's subjective psychological visual space. The optimum range for bead size is a diameter ranging from 300 nm to 1000 nm.

The bead layer can be replaced by a partially diffusive layer, which scatters the image at a diversity of angles thus increasing the viewing angle accessible to observers as does the bead layer. The partially diffusive layer has intrinsic and extrinsic inhomogeneities in its index of refraction that represent optical scattering surfaces within the layer which increase the three dimensional quality of the image in the same way as the bead layer. The three dimensional effect from the diffusive layer, however, is not as dramatic as with the bead layer.

The first part of the theory alone can present images in apparent three dimensions. The first and second parts of the theory combined presents images in apparent three dimensions with a higher quality.

The second part of the theory however cannot stand alone in practice. For the second part of the theory to stand alone one would have to use a screen that had only a bead layer and no polarizing layer. In order for the bead layer alone to stop a projected image it would have to be made out of materials that were opaque or it would have to be so thick that even transparent beads when stacked up in such a thick layer would become opaque as an embodiment. Hence, the screen would be opaque and two dimensional images when projected onto a two dimensional screen that is opaque to the naked eye, always look two dimensional, since the effect of transparent boundary lines between objects in a scene is absent.

CONCLUSIONS, RAMIFICATIONS, AND SCOPE

Thus projecting two dimensional images onto two dimensional screens as described in this specification will produce images of entire scenes in apparent three dimensions. We can think of the static part of the invention as being the multi-layered composite sheet polarizing screen and the dynamic part of the invention as being the light that is projected onto the screen. The intensity and the mixture of polarization states of the projected light can determine the dimension of each optically active layer in the screen. Equivalently the dimension of each optically active layer in the screen can determine the intensity and mixture of polarization states of the projected light.

If you define the screen or static part of the invention first, the dynamic part of the invention is defined to be light with the necessary intensity and mixture of polarization states for the invention to work.

If you define the light or dynamic part of the invention first the static part of the invention is defined to be those multi-layered screens whose optically active layers are of the dimensions necessary for the invention to work.

It is the unique interaction of static and dynamics elements that makes the invention work.

The proposed invention can be applied to make rear projection televisions and computer displays, with resolution from 285 lines up to 1080 lines, which are three dimensional. It therefore can produce products that are equal in screen size and resolution to, high definition televisions, high definition computer displays, and digital television, but such products derived from the proposed invention would be superior since they would be three dimensional. The images would be three dimensional because of the optics of the invention and nothing would need to be changed in the way the images are collected. Equivalently the proposed invention is a three dimensional television or computer display, which does not require eyewear.

In the same way the proposed invention can convert movie theaters into three dimensional movie theaters without the use of eyewear and without changing the film or the way movies are made.

The numbered screens and the numbered system designs in this specification do not correspond to claim numbers.

While the description throughout this specification contains many specificities, these should not be construed as limitations on the scope of the invention but rather as only several preferred embodiments thereof. Accordingly, the scope of the invention should be determined not by the embodiments shown but by the appended claims and their legal equivalents.

I claim:

1. A screen onto which images may be projected with light of multiple visible wavelengths and viewed in apparent three dimensions comprising:

(a) parallel plane layers consisting of a transparent substrate, a polarizing layer, and a partially transparent bead layer;

(b) means for bonding said parallel plane layers together;

(c) said bead layer comprising beads embedded in a base whose index of refraction is different than that of said beads;

wherein (d) a portion of said beads have a diameter within a range, R, comprising 300 nm–1000 nm;

(e) a portion of said light is reflected or absorbed by said polarizing layer;

(f) said screen further comprising a perimeter, P, defining an area, A, wherein an optical surface area of said beads whose diameter is within R, is at least 100 times larger than A.

2. The screen of claim 1 wherein said bead layer has a reflectivity greater than twenty percent.

3. The screen of claim 1 wherein said bead layer has a reflectivity less than twenty percent.

4. The screen of claim 1 wherein said polarizing layer comprises a metal polarizer.

5. A screen onto which images may be projected with light of multiple wavelengths and viewed in apparent three dimensions comprising:

(a) parallel plane layers consisting of a transparent substrate, a polarizing layer, and a diffusive layer;

(b) means for bonding said parallel plane layers together;

(c) said diffusive layer comprising diffusive particles embedded in a base, said base having an index of refraction different than that of said particles;

wherein (d) a portion of said diffusive particles have a dimension between 300 nm–1000 nm;

(e) a portion of said light is reflected or absorbed by said polarizing layer (f) said screen further comprising a perimeter, P, defining an area, A, wherein an optical surface area of said diffusive particles is at least 100 times larger than, A.

6. The screen of claim 5 wherein said diffusive layer has a reflectivity greater than twenty percent.

7. The screen of claim 5 wherein said diffusive layer has a reflectivity less than twenty percent.

8. The screen of claim 5 wherein said polarizing layer comprises a metal polarizer.

9. A screen onto which images may be projected with light of multiple visible wavelength and viewed in apparent three dimensions comprising:

(a) parallel plane layers consisting of a transparent substrate, a polarizing layer, and an intrinsically diffusive layer;

(b) means for bonding said parallel plane layers together;

(c) said intrinsically diffusive layer comprising a material having an intrinsic spatial periodicity in its refraction index, i, where a value, b, is the dimension over which i varies through one cycle wherein, a portion of the volume of said intrinsically diffusive layer has a value, b, which is between 300 nm–1000 nm;

(d) a portion of said light is reflected or absorbed by said polarizing layer;

(e) said screen further comprising a perimeter P defining an area, A, of said screen wherein an optical surface area of the intrinsically diffusive layer is at least 100 times larger than A.

10. The screen of claim 9 wherein said diffusive layer has a reflectivity greater than twenty percent.

11. The screen of claim 9 wherein said diffusive layer has a reflectivity less than twenty percent.

12. The screen of claim 9 wherein said polarizing layer comprises a metal polarizer.

13. The screen as in any of the preceding claims further comprising means for converting light of an initial single polarization into a mixture of two orthogonal polarizations.

14. The screen of any one of claims 1–12 further comprising either an LCD or CRT display or an LCD or CRT projector.

15. The screen of claims 1–12 further comprising means for collecting and storing said images.

16. A projection system comprising a screen as in any of claims 1–3, 5–7, 9–11 further comprising.

(a) means for projecting said images with said light;

(b) said polarizing layer having an absorption sense and a transmission sense;

(c) means to control said light to have a first portion having a first intensity, $I_1$, having an electric field sense equal to the absorption sense of said polarizing layer, and a second portion having an intensity, $I_2$, having an electric field sense equal to the transmission sense of said polarizing layer;

wherein (d) the total intensity of said light is equal to the summation of $I_1$, and $I_2$.

17. The projection system of claim 16 where said screen is a rear projection screen.

18. The projection screen of claim 16 where said screen is a front projection screen.

19. The projection system of claim 16 wherein, $I_2$ is equal to zero, and said is a rear projection screen.

20. The projection system of claim 16, wherein, $I_2$, is zero and said screen is a front projection screen.

21. The projection system of claim 16 wherein said screen is simultaneously a rear projection screen and a front projection screen.

22. A projection system for displaying images in apparent three dimensions comprising a screen as in any one of claims 4, 8 or 12 further comprising: means for projecting said images with projected light; said polarizing layer having a reflection sense and a transmission sense; means to control said light to have a first portion having a first intensity, $I_1$, having an electric field sense equal to the reflection sense of said polarizing layer, and a second portion having an intensity, $I_2$, having an electric field sense equal to the transmission sense of said polarizing layer wherein the total intensity of light is equal to the summation of $I_1$ and $I_2$.

23. The projection system of claim 22 wherein $I_2$ is zero and said screen is a front projection screen.

24. The projection system of claim 22 wherein said screen is simultaneously a rear projection screen and a front projection screen.

* * * * *